United States Patent [19]
Mishra et al.

[11] Patent Number: 5,805,118
[45] Date of Patent: Sep. 8, 1998

[54] DISPLAY PROTOCOL SPECIFICATION WITH SESSION CONFIGURATION AND MULTIPLE MONITORS

[75] Inventors: Prateek Mishra, Port Jefferson; Donald P. Harrington, Setauket; Arie E. Kaufman, Plainview; Philip M. Lewis, Stony Brook; Stephen D. Shapiro, E. Setauket; Esther D. Shilcrat, Port Jefferson, all of N.Y.

[73] Assignee: Research Foundation of the State of New York, Stony Brook, N.Y.

[21] Appl. No.: 578,882

[22] Filed: Dec. 22, 1995

[51] Int. Cl.⁶ .................................... G06F 3/00
[52] U.S. Cl. .................... 345/1; 345/333; 345/329
[58] Field of Search ..................... 345/326–358, 345/123–125, 173; 395/200.47

[56] References Cited

U.S. PATENT DOCUMENTS

| | | | |
|---|---|---|---|
| 5,072,412 | 12/1991 | Henderson, Jr. et al. | 345/329 X |
| 5,115,501 | 5/1992 | Kerr | 345/334 X |
| 5,430,835 | 7/1995 | Williams et al. | 395/154 |
| 5,467,102 | 11/1995 | Kuno et al. | 345/1 |
| 5,502,727 | 3/1996 | Catanzaro et al. | 370/94.2 |
| 5,515,491 | 5/1996 | Bates et al. | 395/155 |
| 5,524,193 | 6/1996 | Covington et al. | 395/154 |
| 5,530,859 | 6/1996 | Tobias et al. | 395/650 |
| 5,535,321 | 7/1996 | Massaro et al. | 345/337 |
| 5,550,966 | 8/1996 | Drake et al. | 395/154 |
| 5,553,222 | 9/1996 | Milne et al. | 395/154 |
| 5,581,243 | 12/1996 | Ouellette et al. | 345/173 |
| 5,583,980 | 12/1996 | Anderson | 395/173 |
| 5,585,821 | 12/1996 | Ishikura et al. | 345/1 X |
| 5,596,702 | 1/1997 | Stucka et al. | 345/340 |
| 5,600,775 | 2/1997 | King et al. | 395/806 |
| 5,600,776 | 2/1997 | Johnson et al. | 345/326 |
| 5,657,046 | 8/1997 | Noble et al. | 345/123 |
| 5,710,884 | 1/1998 | Dedrick | 345/200.47 |

OTHER PUBLICATIONS

ShareView and ShareView Plus Reference Manual, Mar. 1993, pp. 1, 38–41.
IBM Person to Person/2: Installing and Using Guide, Jan. 1994, pp. 1.1.–1.5, 7.1–7.7, 7.14–7.15.
Whiteboard User Manual, Interactive Whiteboard and Document Sharing Software, Feb. 1993, pp. i–xii, 1,58–75.
Au, et al. "An Intelligent Multimedia Patients Information System; Design Problems and Solutions," Proceedings of the 28th Hawaii International Conference of Systems Sciences, pp. 451–460, vol. 3 (Jan. 1995).
Treves, et al., "Multimedia Communications in Medical Imaging," IEEE Journal on Selected Areas in Communications, vol. 10, No. 7, Sep. 1992, pp. 1121–1132.
Robinson, et al., "A Multimedia Interactive Conferencing Application for Personal Work Stations," IEEE Transactions on Communications, vol. 39, No. 11, Nov. 1991, pp. 1698–1708.
CreativePartner User's Guide, Emotion, Inc., pp. 1–5, 45–53.
Imageexpo User Manual, "Interactive Remote Viewing Annotation Software for the Graphic Art Professional", Group Logic Inc., 1194, pp. 87–99 (1994).
Vis–A–Vis End User Guide, Version 2.1, Future Labs, Inc. 1993, pp. 3–10–15.

*Primary Examiner*—John E. Breene
*Attorney, Agent, or Firm*—Meltzer, Lippe Goldstein, et al.

[57] ABSTRACT

This and other objects are provided in a method for displaying and managing a set of related images. The invention includes design of screen area in terms of how many, how big, and where workspaces are located. The invention assigns image sets to different workspaces; creates a tree of workspace setups for a specific image viewing session; and allows customization of the tree on a per user, per workstation type basis.

6 Claims, 28 Drawing Sheets

FIG. 5G

```
PreviousImages = NextImage;                                        ┌─154 for i = 1 to sqrt(Preview) do for j = 1 to sqrt(Preview) do begin

OneLayout[LayoutCount].Xpos = NextXpos;
OneLayout[LayoutCount].Ypos = NextYpos;
OneLayout[LayoutCount].ImageNo = PreviousImages;
OneLayout[LayoutCount].ScreenInfo        =        Segment -
[NextSegment].ScreenInfo;
O n e   L a y o u t   [ L a y o u t C o u n t ] . H e i g h t   =
ImageSize[PreviousImages].
Height*PreMagFactor;
OneLayout[LayoutCount].Width   =   ImageSize[PreviousImages].
Width*PreMagFactor;
N e x t X p o s     =     N e x t X p o s     +
(i-1)*PreMagFactor*ImageSize[PreviousImages].Width;
N e x t Y p o s     =     N e x t Y p o s     +
(j-1)*PreMagFactor*ImageSize[PreviousImages]
.Height;
LayoutCount   =   LayoutCount   +   1;       PreviousImages =
PreviousImages - 1
end of for loops
NextImage = NextImage + 1;
```

FIG. 5J

```
NextXpos = NextXpos -
ImageSize[NextImage-1].Width*MagFactor;
NextYpos = NextYpos -
ImageSize[NextImage-1].Height*MagFactor;
NextImage = NextImage -1; LayoutCount = LayoutCount -1;
PostImages = NextImage;NextImage = NextImage+1;
for i = 1 to sqrt(Postview) do
for j = 1 to sqrt(Postview) do
begin
OneLayout[LayoutCount].Xpos = NextXpos;
OneLayout[LayoutCount].Ypos = NextYpos;
OneLayout[LayoutCount].ImageNo = PostImages;
OneLayout[LayoutCount].ScreenInfo    =    Segment -
[NextSegment].ScreenInfo;
OneLayout[LayoutCount].Height =
ImageSize[PostImages].Height*Post
MagFactor;
OneLayout[LayoutCount].Width =
ImageSize[PostImages].Width*PostMagFactor;
NextXpos = NextXpos +
(i-1)*PostMagFactor*ImageSize[PostImages].Width;
NextYpos = NextYpos +
(j-1)*PostMagFactor*ImageSize[PostImages].Height;
LayoutCount = LayoutCount + 1; PostImages = PostImages +
1
```
— 174

```
VirtualPageForLayout[NextPage].start = PageStart;
VirtualPageForLayout[NextPage].stop = LayoutCount - 1;
NextPage = NextPage + 1; PageStart = LayoutCount;
NextSegment = 1;
```
— 176

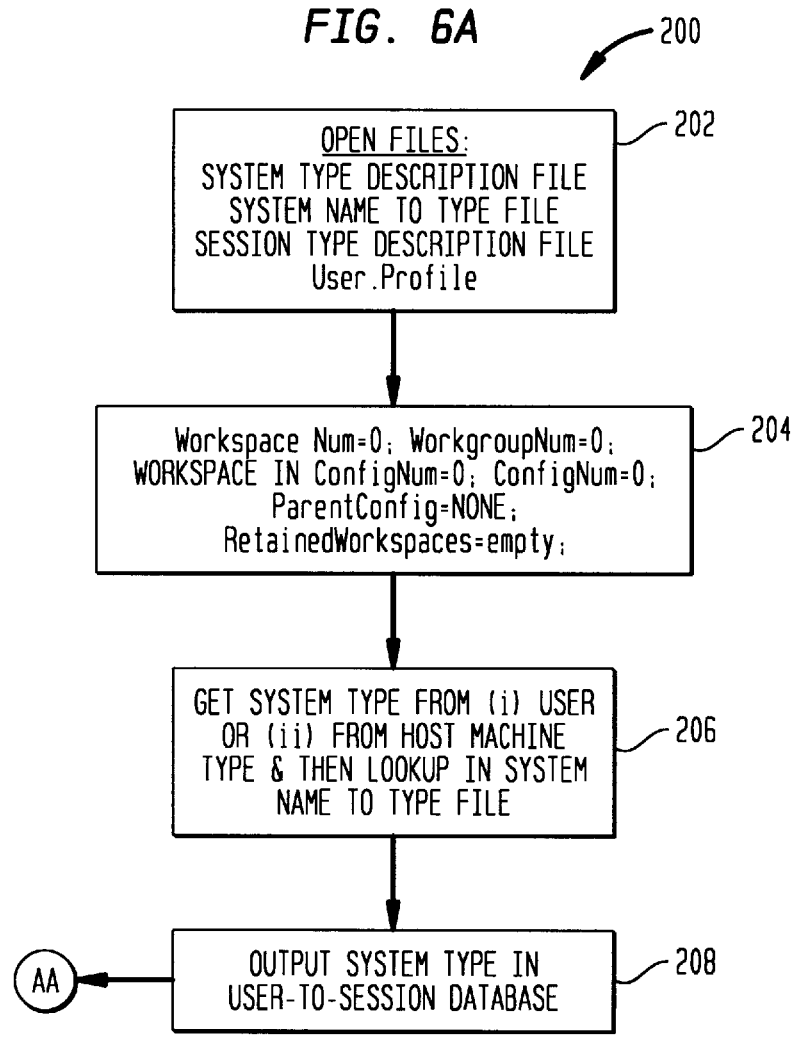

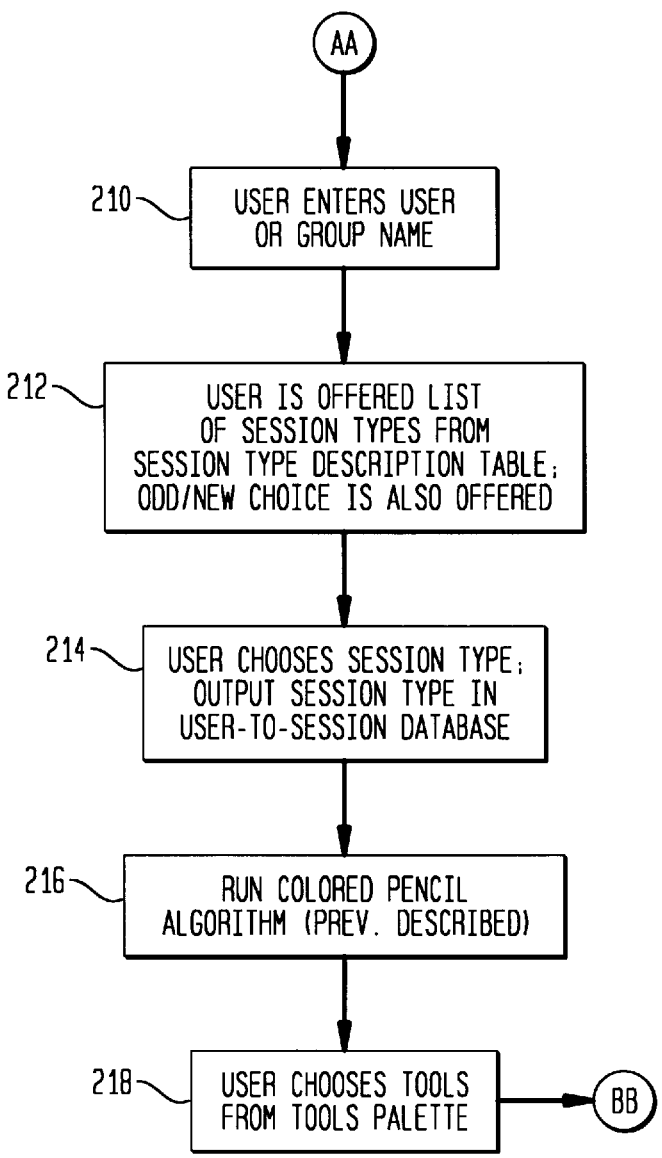

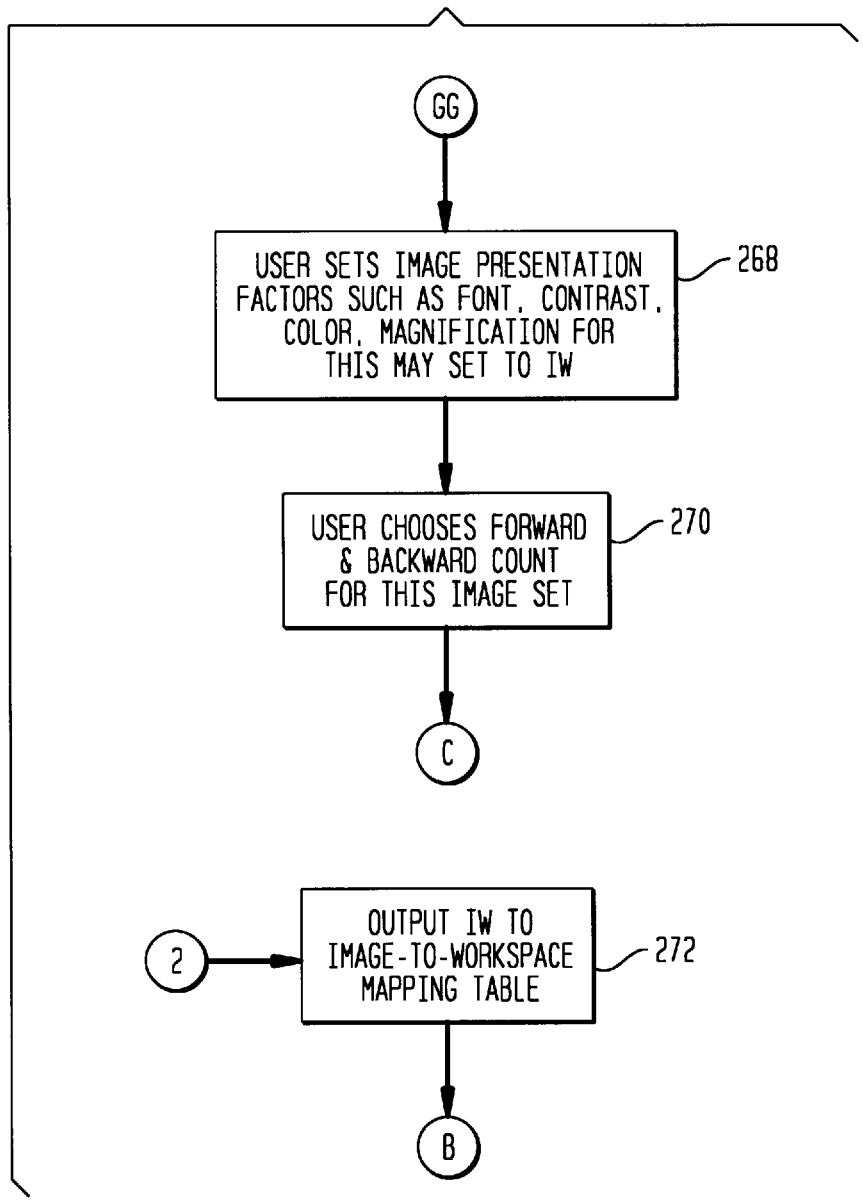

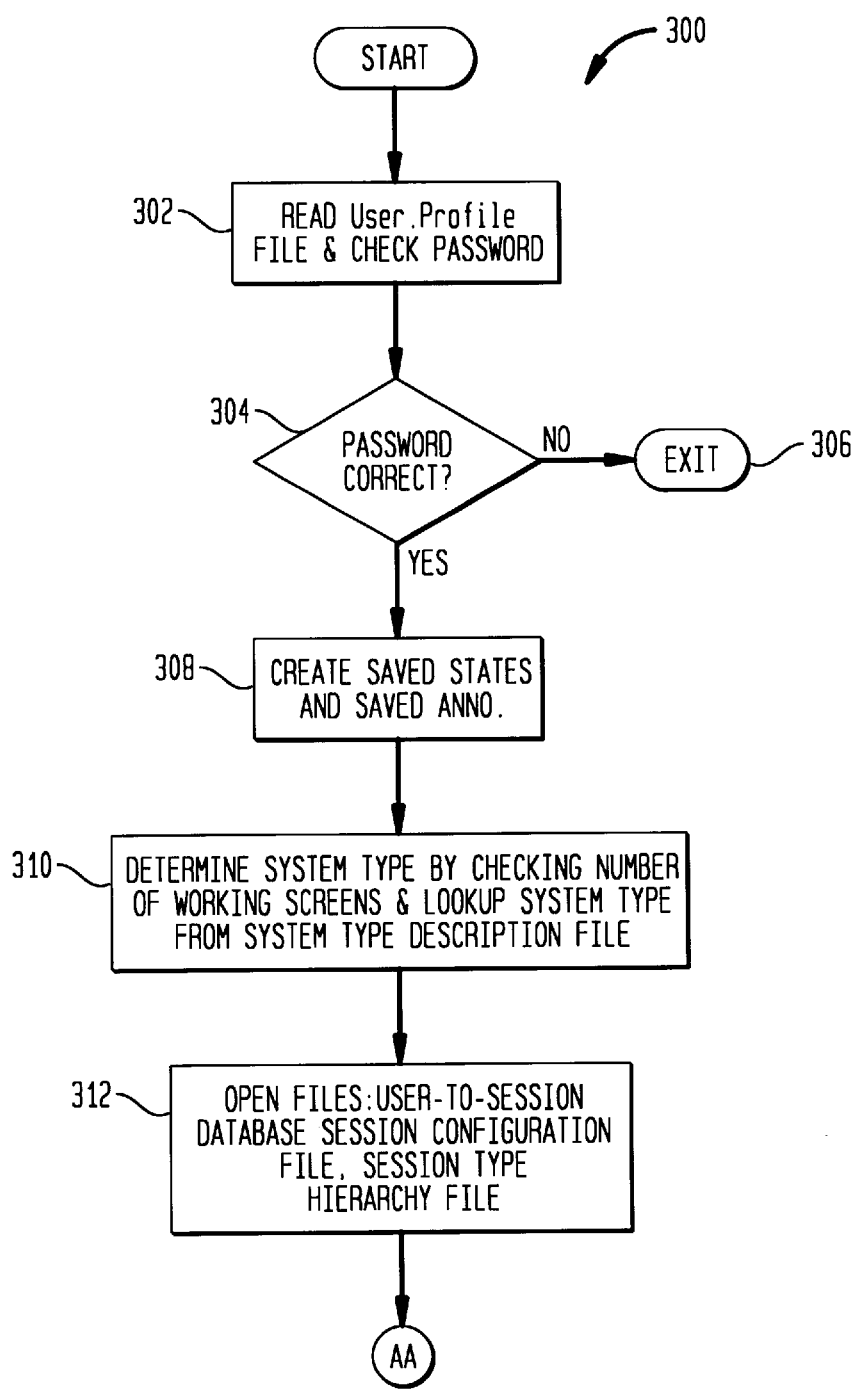

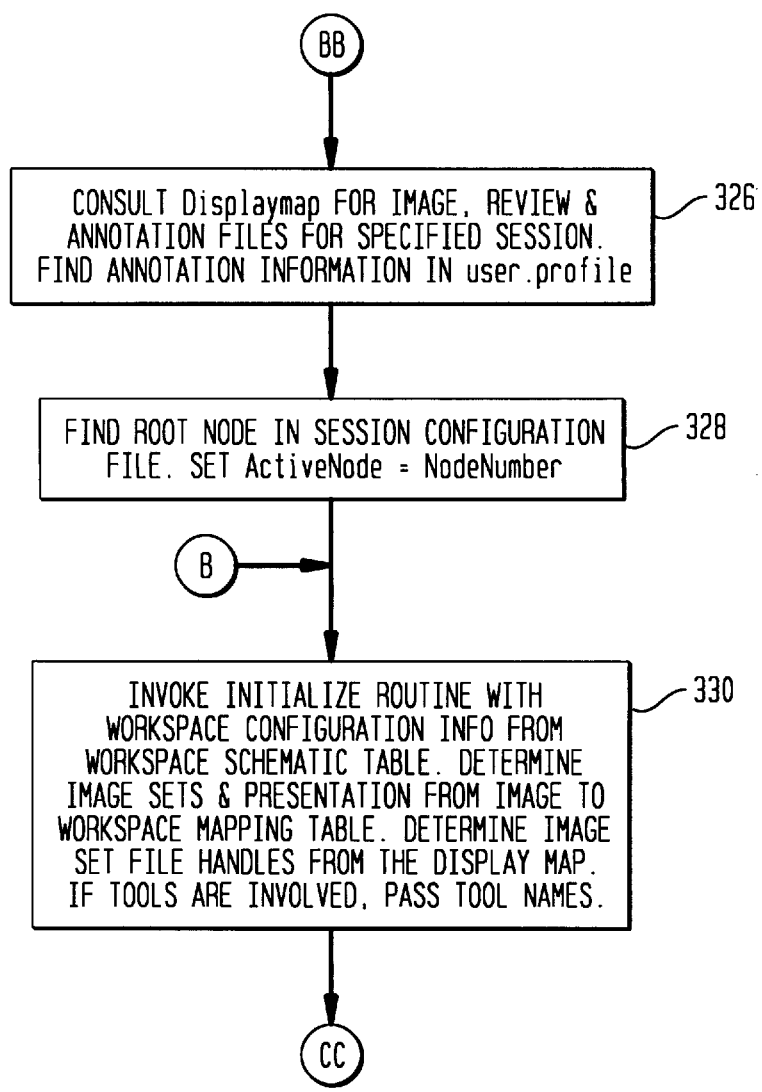

DISPLAY PROTOCOL SPECIFICATION WITH SESSION CONFIGURATION AND MULTIPLE MONITORS

RELATED APPLICATION

This patent application includes subject matter related to U.S. patent application Ser. No. 08/451,830, filed on May 26, 1995 and entitled "Multimedia Memo Writing and Response". The application has the same inventors and is assigned to the same assignee as the present invention. The content of this related application is incorporated herein by reference.

FIELD OF THE INVENTION

The present invention relates to computer graphics and, more particularly, to a method for customizing image display according to a user's preference depending on computer set up, image type, and other variables.

BACKGROUND OF THE INVENTION

A major advance in computing is improvements in computer imaging. Current state-of-the-art computers have increased processing speeds and large random access memories. These capabilities support image display applications not previously practical. Decreasing hardware costs have made it increasingly possible to display high quality images on screen, such as video based images, photos, images of physical documents (such as checks), images of virtual documents (such as produced by text formatting programs or WYSIWYG editors), medical images such as those generated by X-ray, ultra-sound, others apparent to those skilled in the art. Even plain text can be considered a simple image. Thus, one may expect more and more user interfaces to be image based or contain some image components.

Microsoft-Windows, available from Microsoft Corp., Redmond, Wash. and X-Windows, a public domain program, provide software to create and manipulate an area on a computer screen called a "window", in which an image can be displayed. Windows are rectangular areas of a single screen, which may be used to partially or fully tile that screen, with possible overlaying. A window cannot be greater in size than an entire computer screen, nor are windows synchronized with other windows. Moreover, no general system layout is known that displays and/or manages sets of images.

Current computer screen layout technology is based on this window concept. Windows can provide certain interconnected type of actions, for example, if re-sized, the window contents may be appropriately changed (i.e., font change in a text-based window, or less text displayed).

Windows are a general paradigm for a single screen workstation situation. However, in user interfaces primarily based on image viewing, the user may desire to see several related sets of images at once, and/or in a particular sequence. Where the image sets are related, there often are interconnections between them. For example, a publishing house may need to review computer images of a typeset book. A book may have several image sets related to each other; such as a table of contents; a set of chapters; composed of individual pages of text and illustrations; and an index. A user, for example, may wish to see the text in one screen area and the table of contents in another with interconnections, such as highlighting table of contents to match the text being viewed, or displaying text based on a portion of the table of contents movement in which the user is interested. Thus, for example, if a user hit the "next" button while viewing text, and the next text entry is a new chapter or section, the image in the table of contents area may advance to reflect this change.

Systems that control layout and management in the specific area of radiology are known. Such systems include "MagicView" by Siemens Medical Systems, Iselin, N.J. and "Montage", by Picker International, Cleveland, Ohio. However, current radiological image display systems have several drawbacks. They do not allow a user to predefine the image display format according to the type of images being viewed. They do not support image display on an arbitrary number of monitors each of arbitrary size and width, and do not provide innovative tools for image display such as review sets, Pre/Post view, floaters, saving and restoring state, and the like. None of these known systems provides a customization of image layout format according to the user, the topic, type of image being viewed, etc.

A number of experimental systems for the display of radiological images are known. One example is "Multimodality Single-Point-of-Contact Workstation", *Space* 9220WSGN, by S. B. Seshadri, S. C. Horii, J. F. Stevens, S. Kishore, and H. L. Hundel, which was demonstrated at Radiological Society of North America (RSNA) Scientific Assembly and Meeting, November (Abstract on 472 of Scientific Program Vol 193(P), Supplement to *Radiology*). This reference discloses a stack of images which may be displayed and modified via operations such as window and level, marking images with lines, measuring distances and angles, and adding written annotations.

An experimental single point of contact workstation is described in *Space* 9222WSPA "Access to Multimedia Information from a PACS", by M. R. Ramaswamy, D. E. Avrin, H. K. Huang, R. L. Arenson, A. W. Wong, and K. P. Andriole, and demonstrated at RSNA Scientific Assembly and Meeting, November 1994 (Abstract on p.473 of Scientific Program, Vol 193(P), Supplement to *Radiology*. This workstation allows both stack and tile (referred to herein as a "frame") mode for image display.

A Computed Tomography (CT), Magnetic Reasonable Imaging (MR), and computed radiography system is described in the "Access to Multimedia Information from a PACS" article. This system allows a series of images to be tiled on either half a screen, a single screen, two screens, or three screens, or some combination of these, as chosen by a user.

*Space* 9217WSGN, "Scalable Multimodality Diagnostic Workstation Featuring 'Virtual Environment', Multiband Cine, Temporal Synchronization, and Real Time, Distributed, Interactive Consultation", by P. J. Chang and demonstrated at Radiological Society of North America (RSNA) Scientific Assembly and Meeting, November 1994 (Abstract on P.472 of Scientific Program, Vol 193(P), Supplement to *Radiology*) provides some synchronization of previous and current studies (referred to herein as "old" and "new") for MR. How the synchronization is performed is not clearly described. The implementation describes a "virtual workspace" of between 1–16 screens. It is not clear, however, if the user configures the workspace, or if it is one gigantic unit. The experimenter also orally discussed the need to provide customization for radiological examinations. However, little or no software support was implemented for this idea.

Another experimental neuroradiology interface is disclosed in *Space* 9226WSPA "Radiologist-Oriented Interfaces for Diagnostic Neuroradiology" by D. J. Valentino, V.

Bhushan, D. Fuchs, W. Reuger, and J. R. Bentson, and demonstrated at Radiological Society of North America (RSNA) Scientific Assembly and Meeting, November 1994 (Abstract on P.473 of Scientific Program, Vol 193(P), Supplement to *Radiology*). This device allows a user to tile, ad hoc, a screen with different types of image display "boxes"0 (e.g., cine loop box, miniature image box, full-size image box) resulting in many different possible screen configurations. Layouts could not span a screen, nor was there a way to specify semantic connections between the different types and instances of the boxes, such as would be required for synchronization.

A number of image display tools for a variety of uses are available in the marketplace. Examples include "Magic-View: and "Montage", described above. Both products function with a fixed number of monitors of fixed size and offer very limited support for customization. Customization is limited to choosing a few user-preferences for the magnification, contrast, and intensity settings for images based on exam type. They do not allow users to design screen display layout formats based on session type; there is no concept of a display protocol.

The window paradigm does not exploit the rich image structure which is often available, and which can help the user create a sophisticated image viewing session. Windows do not provide assistance in structuring the layout of the screen to enable, for example, related image sets to be simultaneously viewed in distinct windows. Windows provide the callback mechanism, by which any arbitrary code can be executed in response to a user action in a window. However, there is no built-in method specifically designed to provide communication between two or more windows. Thus, for example, windows do not provide an automatic way to structure the display of the book so that the semantic connections between the constituent image sets are exploited to the user's advantage.

Another example is a user who wishes to see the video of a person speaking in sync with the display of images the person is explaining. Further, a window may not span beyond a single screen. This is relevant in multi-screen workstations, where, for example, the user may want all available area to display, contiguously, as much of a text document as is possible. This would require that several screens act in unison to display the text.

Therefore, it is an object of the present invention to provide a method and apparatus to customize an image display system so that the display is tailored to a particular user, a particular computer configuration, the type of images being viewed, etc.

It is another object of the present invention to provide a method for creating and maintaining interconnections between images in a set.

It is yet a further object of the present invention to provide a method and apparatus for creating and managing a multi-screen workstation for viewing a plurality of related images.

SUMMARY OF THE INVENTION

This and other objects are provided in a method for displaying and managing a set of related images. The invention permits the design of screen area in terms of how many, how big, and where workspaces are located. The invention assigns image sets to different workspaces; creates a tree of workspace setups for a specific image viewing session; and allows customization of the tree on a per user, per workstation type basis.

Entitled The Customizable Image Navigation and Display System, or CINAD, the invention assists in establishing interconnections between workspaces, as well as specific links for frequently used connection types, such as lock-step or general synchronization. The result is a user configurable, workstation tailorable display protocol. The images may be displayed on a number of monitors. The display format may be configured to suit the user's needs. The images may be interconnected and/or be synchronized.

A new paradigm for screen layout management called the "workspace" is proposed. A workspace is a sequence of areas on a set of screens. Thus, a workspace may span beyond a single screen and hence provide larger logical viewing units than that afforded by a window. This is useful in situations where there are many images to be viewed. Such users frequently employ multiple screens and need to configure them to best suit their needs, including displaying one set of related images using all screens. Workspaces may also be synchronized with each other. Thus, for example, a person reviewing a document could have a large workspace showing text of a document, and a smaller one showing the table of contents of that document, highlighted to indicate which section the user is currently viewing.

In an application with many image sets, screen space limitations may force the user to view the sets in a particular sequence. To accommodate this, the user may wish to change the workspace setup during an image viewing session. For example, the user may initially want three workspaces in which to review the table of contents, the index, and the chapters of a book, respectively. When done viewing these, the user might want to dismiss them and see, in four re-sized workspaces, the acknowledgements, the dedication, the author's photo, and the cover of the book, respectively. In different applications, a workspace setup might have alternating following setups, perhaps conditionally based. For example, someone reviewing cell photos might want to see one kind of information, tailored properly into workspaces, if a specific condition is found, and another otherwise. Hence workspace setups may form a tree. As used herein, the term "workspace display protocol" or "display protocol" means the tree of workspace setups involved in a single image session.

Workspaces support intra-workspace interconnections: as noted in the book example above, whenever the person moves through the text (such as via next/forward, or backward keys), the table of contents gets re-highlighted appropriately. A workspace setup denotes the set of workspaces to be displayed at the same time, and includes, for example, information regarding workspaces location, what types of image sets go to each workspace, presentation factors (while others are determined at run-time), increment units for going backwards or forwards within a workspace, and synchronization information between the workspaces.

The workspace paradigm thus provides greater flexibility than windows, via interconnections between workspaces, in dealing with multi-screen workstations, and via the workspace display protocol. To take advantage fully of this greater flexibility, a means for specifying a protocol for sequencing images to be viewed is provided.

Our approach provides for more modes of image display (Pre/Post view, integration of floaters and freezers, overview, review etc.), a more general, and multi-screen approach to an image display unit (the workspace) which includes synchronization, as well a method to support customization of image layout format based on session type.

Another important variable is workstation configuration. Not all machines in an office have the same capabilities; people also may have smaller setups at home. Thus, users may wish to tailor their display protocol to each type of workstation they frequent. This yields a descriptive triple viewing: session type/for user/on workstation type.

A publishing user, for example, may want completely different workspace setups than a radiological user, and may want different workspace setups for different types of books.

The present invention differs from the devices disclosed in the "Access to Multimedia Information From a PACS" because the present invention provides for more modes of image display mode (Pre/Post view, integration of floaters and freezers, overview, review etc.), a more general, and multi-screen approach to an image display unit (the workspace) which includes synchronization, as well as an algorithm to support customization of image layout format based on session type.

In contrast to the "Scalable Multimodality Diagnostic Workstation", the present invention provides more modes of image display (Pre/Post view, integration of floaters and freezers, overview, review etc.), a multi-screen approach to an image display unit (the workspace) which allows for arbitrary kinds of synchronization (i.e, not just based on old/new), as well as an algorithm to support customization of image layout format based on session type, which has built-in support for the specific synchronization required in an old/new viewing session.

In contrast to "Radiologist-Oriented Interfaces for Diagnostic Neuroradiology", the present invention provides for more modes of image display, perhaps most significantly, the ability to float or freeze images within a frame percentage (as opposed to a percentage of previously chosen independent image which has no connection to the rest of % the pictures around it) and the use of support for Pre/Post view within a multi-screen approach to an image display unit (the workspace) which allows for arbitrary kinds of synchronization (i.e, not just based on old/new), as well as an algorithm to support customization of image layout format based on session type, which has built-in support for the specific synchronization required in an old/new viewing session.

In contrast to known image display tools, the present invention encompasses the use of a variable number of monitors, user-designed per-exam type layout display formats, and special review techniques.

BRIEF DESCRIPTION OF THE DRAWINGS

The present invention is described with reference to the following figures:

FIGS. 5A–5J is a flow chart of a preferred basic layout algorithm according to the present invention;

FIGS. 6A–6J is a flow chart of a preferred display protocol specification algorithm according to the present invention; and FIGS. 7A–7G is a preferred display generation algorithm according to the present invention.

DETAILED DESCRIPTION OF A PREFERRED EMBODIMENT

Introduction

Figure 1:
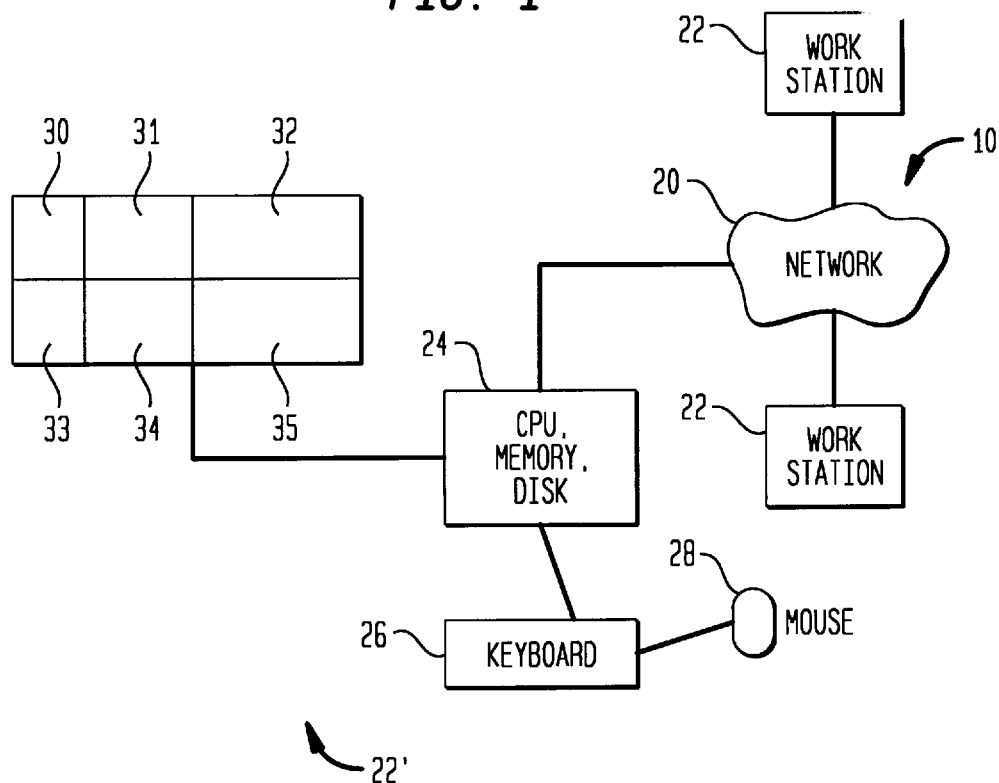
FIG. 1 is an illustrative hardware configuration used for the present invention.

CINAD based software is described herein in general terms, explaining how to provide the end-user with method for structuring customized image display, and for navigating through these structures. The customized image displays are based on user preferences, workstation capabilities, application specific information regarding the image sets involved, and relevant semantic connections between the image sets (such as those required for synchronization). CINAD may also be used on different workstation configurations. CINAD is designed to be compatible with systems having any number of monitors, and for monitors having variable resolution for image display. As computer technology advances it becomes feasible to have larger numbers of monitors of larger size (resolution) available at an economical price.

A specific and important embodiment of CINAD relates to the field of radiology. Radiology is a particularly rich area image arena: radiological examinations based on CT and MR involve hundreds of images which must be examined quickly and accurately to make a diagnosis. This is particularly true in neurological and cross-sectional radiology.

CINAD-R is a version of CINAD tailored to radiology. By studying this embodiment of CINAD, application specific information of which images sets are involved in particular types of examinations displays both the strengths of CINAD, and a specific example of how application specific information regarding image sets is used in the creation of customizable image systems are provided.

Radiological image reading requirements fit naturally into the concepts of CINAD. Radiological exams are organized around the concept of an exam protocol. Thus, for example, CT examination of the spine may involve a series of images with a contrast medium and another without a contrast medium. Examination of the abdomen may involve a completely different exam protocol. Each type of examination may require different forms of image display. Further, in doing a specific type of diagnostic reading, more than one exam may be required. Moreover, such practitioner may desire a unique image display for each type of examination. Thus, CINAD provides flexibility in image display formats.

This is accommodated by allowing the user to access as many exams as needed. For example, spinal exams may require both CT and MR imaging. Thus, a format for the diagnostic image reading session may include both types of images. This disclosure discusses "session types". In a radiological embodiment, a "session type" may mean a spine diagnosis session. A person skilled in the arts recognizes other "session types" relevant to other applications. Hence, a display is physician configurable, as it provides each individual doctor (or group) with a display tailored to individual preferences and thus minimizing reading time. As in the general case, the protocols are workstation tailorable. This may be particularly important in the CINAD-R case, as the different classes of users (surgeons, physicians, radiologists) will prefer to use systems of varying capacity and cost. Also, many users will have an "at home" workstation having different capacity (i.e., number of monitors, monitor resolution, etc.) than their "in office" workstations.

Hardware and Software Required for CINAD

FIG. 1 shows an illustrative hardware configuration 10 for a preferred embodiment of the present invention. The present invention may, for example, be used on a network 20, which may be a local area network such as a Ethernet network or a wide area network. A number of workstations 22, such as a SUNSparc workstation, may be connected to the network. One workstation 22' is shown in detail. A workstation 22' may have a central processing unit (CPU)

and memory 24, keyboard 26, and a mouse 28. The workstation may optionally be equipped with one or more monitors 30,31,32,33,34,35.

Figure 2:
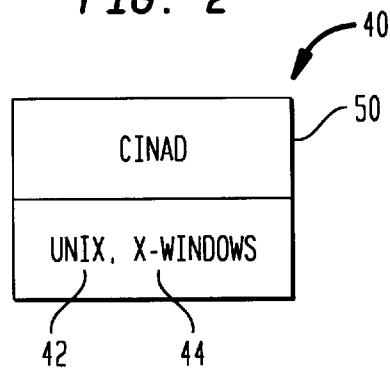
FIG. 2 is an illustrative software configuration for the present invention.

FIG. 2 shows an illustrative software configuration 40 for a preferred embodiment of the present invention. Each workstation is equipped with an operating system (such as UNIX) 42, and Windowing System (such as X-Windows) 44. Additionally, each workstation is equipped with CINAD software 50, which resides on top of this operating system and windowing system software.

Technical Description and Terms

CINAD describes an innovative image display system, which can be used to provide a customized way of navigating through structured sets of images. Various image display and manipulation tools may also be provided. Definitions of these tools and brief description are provided in Appendix A.

The present invention is illustrated using two exemplary embodiments. These embodiments are text editing and radiological examination uses. The reader understands, however, that the invention encompasses may embodiments.

These tools are particularly important to CINAD-R (radiology). The large amount of images generated by CT and MR imaging presents a significant opportunity for CINAD-R to showcase the strengths of CINAD's computer-based image display on monitors (as opposed to traditionally used film), and CINAD's approach to image display systems. CINAD-R offers many significant advantages over film, whereby image operations such as window and/or level change, magnification, and reverse video, serve to clarify images and hence speed the exam process. Image marking and review set creation speed the review process, whether by the same user or another. Further, the radiologist is generally more accustomed to reading on a larger area of light boxes than can be afforded by the use of monitors. Image navigation techniques help the user manage image layout, with the now smaller "reading area". Customization allows the software to easily adapt to changing technology (number, size, and configuration of screens) and encourages radiologists to encode clinical knowledge in software, concerning the manner in which images are examined. (Note that such changing technology is common in this application area, where, for example, the attending physician, the surgeon, the radiologist, and radiological technical support staff are all likely to have different workstation configurations based on their relative frequency of use/need.)

CINAD-R is designed for use by radiologists for it primary diagnosis. This is in contrast to most other available medical image display software which is for emergency use or secondary review. CINAD-R is expected to have a substantial positive impact on radiologist productivity because radiologists can design image display methods that correspond substantially to their own training, preferences, and experience.

Implementation and Algorithms

This section describes:
(i) Image Display Software Architecture, including:
  A. Per Screen Shell;
  B. Workspace Manager;
  C. Image And Annotation Display Software;
  D. Raw Image Data; and
  E. Initialization and Usual State.
(ii) Layout algorithm, a key algorithm supported by the workspace concept; including:
  A. Algorithms Inputs;
  B. Algorithms Outputs; and
  C. Basic Layout Algorithms.
(iii) Display Protocol Specification and Learning Algorithm; and
(iv) Display Protocol Generation and Save/Restore Algorithm.

Image Display Software Architecture

Figure 3:
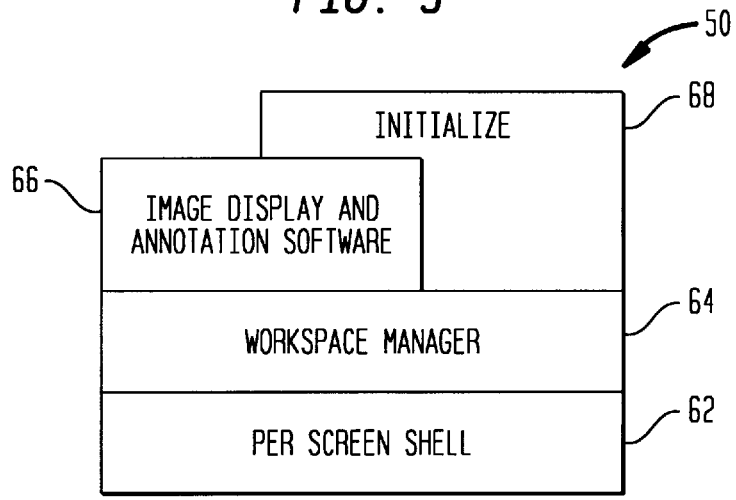
FIG. 3 is an illustrative image display system according to the present invention.

FIG. 3 illustrates an image display system 50 which may be made customizable using the method according to the present invention. To fully understand the invention, a brief description of a generic imaging system is provided. The image display system 50 is organized as a sequence of software layers. Each layer provides functionality to the upper-layers and hides some detailed information that is irrelevant to the upper layers.

As shown in FIG. 3, three key layers providing a foundation for the entire system are:

Per Screen Shell 62: provides a uniform environment for each screen.

Workspace Manager 64: implements multi-screen workspace concept.

Image and Annotation Display Software 66: basic image display operations.

A fourth layer, initialization layer 68 reads in an image data, runs required algorithms, and gets the system run-time state ready to execution.

A. Per Screen Shell

The Per Screen Shell 66 layer provides a single uniform interface for each screen. It makes available a user-specific set of colors and fonts in a uniform fashion on each screen. These colors may range from a set of gray scale colors (medical imaging) or set of distinct colors (text editing). To support easy display of images, it guarantees that colors and fonts are available at fixed locations on all screens (color cell location in the screen-specific color map and index in screen-specific font table). This is important for two reasons. In a multi-screen workstation, the screens may not be homogeneous, and it could be disconcerting to have an image appear one way on one screen, and another way if moved to another screen (i.e., in gray and then in color). The Per Screen Shell allows the upper software layers to construct a single image object which can be similarly displayed on every screen.

Also, since a workspace can span a screen, one may have, for example, one piece of text contiguously displayed on two screens. It is possible to leave out the Per Screen Shell should the user actually prefer to have image appearance screen dependent in this way.

The Per Screen Shell operates as follows:
1. For each display monitor:
  a. record width and height of monitor display area;
  b. create a colormap with gray-scales or colors in fixed positions (i.e., 0==black, 255=white, etc.);
  c. choose fonts suitable for a monitor; and
  d. create window of size width and height with suitable background and foreground color setting.

The outputs of the Per Screen Shell are: the window, colormap, and fonts. Each of these outputs are used by all other layers for displaying on this monitor.

B. Workspace Manager

The Workspace Manager 68 manages a set of workspaces. Each workspace consists of a sequence of regions (a segment), with each region drawn from a specific screen. A workspace may be configured in one of many different modes and basically amounts to a display area of one or more screens as a single unit. Some representative workspace modes are described below:

Stack: Images are overlaid upon each other and displayed sequentially.
Frame: Maximal number of images are displayed and viewed in sequence.
Pre/Post: Frame mode with additional miniature display of selected images.
3-D: Images suitable for 3-D operations are displayed.
Page: Text in a paginated form is displayed in the display area.
Overview: Image set displayed in miniature form for selection.

Each display mode offers different traversal methods for display of an image set. For example, in frame mode, a user may display previous and next frame, last and first frame; in stack mode, a user may display previous, next, last, first image, cine-loop overlay of previous, or next images. Similarly in page mode, a user may display previous, next, goto page, first, last, display all pages with certain text, etc. Cine-loop can optionally be a feature of all modes if desired. An array of workspace objects is maintained at run-time. A preferred embodiment of the present invention used the following data structures:

WorkSpace ArrayofWS[MAX_WORKSPACE]
int TotalWorkSpaceCount
WorkSpace describes a structure with a mode field with a segment count field and an array of records, with each record describing the size, location, and screen number for each segment in a workspace. (N.B. Throughout this section the standard convention of using upper-case names with underscores indicates an arbitrary, but fixed, constant).

A key technology supported by the Workspace Manager 68 is a family of layout algorithms. These algorithms take a sequence of images (each image has a fixed but arbitrary size) together with some layout constraints and generate a physical layout for a workspace consisting of virtual pages. Each virtual page describes all the images and their locations that can be displayed in a workspace at any one instant in time. The exact layout within a virtual page may depend on the mode of the workspace. In stack mode, each virtual page consists of exactly one image; in frame mode, a virtual page would consist of a maximal number of images that can fit within all the workspace segments. A preferred embodiment of the present invention uses the following data structures:

The same image object may occur in many Layout objects, as when displaying 100 images in a workspace that can hold two images at a time but stepping through them one image at a time. In such a case, 200 LayoutInfo entries would be used to hold information about 100 virtual pages.

Array VirtualPage holds the indices of the beginning and end of each virtual page in LayoutInfo for each layout in each workspace. Array CurrentVirtualPageInfo specifies the virtual page which is currently visible in each layout in each workspace. For example, to figure out the images currently displayed in workspace number 2 using layout number 3 we need to lookup j=CurrentVirtualPageInfo[2][3] and then VirtualPage[2][3][j] which provides a pair of indices start and stop; finally, LayoutInfo[2][3][start] to LayoutInfo[2][3][stop] is the layout description of the currently visible images.

The present invention accommodates many different layout constraints, including:

a per-workspace forward count and backward count. Each count indicates the difference in image number of the first image between adjacent virtual pages. The forward count is used when traversing forward through the image set, the backward count reversing the traversal. Observe that many layouts may have to be generated when the forward count and backward count are distinct, each for a different pagination of the image set. Often the forward and backward count are set to the same value (typically), or the smallest number of images visible in any virtual page for this workspace, or half the previous number, etc.

a per-workspace image placement directive which describes placement suggestions for images being laid out. Typically, these take the form that certain images in a workspace must (i) begin a new virtual page, or (ii) "frozen" images, which must remain visible in future virtual pages, once they have been selected to be frozen. An example of the former is when multiple related but distinct image sets are to be displayed on a workspace (several chapters of a book, several series of medical images). Freezer images are often chosen during image display; in such a case, the layout algorithms should be rerun and recompute a new LayoutInfo array once the freezer image has been selected.

Variations such as Frame mode with Pre/Post view in which a few (2, 4, 8, 12, 16, or a user specified number) additional images from previous and following pages are displayed in miniature. The additional images may be Layout LayoutInfo[MAX_WORKSPACE] [MAX_LAYOUTS_PER_WS] -[MAX_LAYOUT_SIZE];
int SelectedLayout [MAX_WORKSPACE];
int CurrentLayoutSize [MAX_WORKSPACE] [MAX_LAYOUTS_PER_WS];
IndexPair VirtualPage [MAX_LAYOUTS_PER_WS] [MAX_WORKSPACE] [MAX_IMAGES];
int CurrentVirtualPageInfo [MAX_WORKSPACE] [MAX_LAYOUTS_PER_WS];

Information on the position of each image within a virtual page is held in array LayoutInfo with each record of type Layout specifying the exact positions, screen number, and handle to the actual image object (i.e., pointer to DImage structure, described below). As explained below, users may associate more than one layout with each workspace during image display. This explains the additional MAX_LAYOUTS$_{13}$ PER_WS index and the use of SelectedLayouts array to determine which layout is currently in use for each workspace.

selected by many different methods: the sequentially preceding or following images, images with annotation, images that have been explicitly selected for pre/post display, etc. Observe that if the user is selecting images for Pre/Post view based on added annotation or explicit selection, then the layout algorithm may need to be re-run during image display. It is even possible for the user to flip between display modes (with and without Pre/Post view) at run-time. In such a case, the system pre-computes two distinct sets of layouts to minimize time spent in computation at run-time.

The following arrays hold the relevant information with the layout constraint information:

```
int ForwardCount [MAX_WORKSPACE] [MAX_LAYOUTS_PER_WS];
int BackwardCount [MAX_WORKSPACE] [MAX_LAYOUTS_PER_WS];
int ImageSetIndex [MAX_WORKSPACE] [MAX_LAYOUTS_PER_WS] [MAX_IMAGES];
Layout *FrozenImages [MAX_WORKSPACE] [MAX_LAYOUTS_PER_WS] [MAX_IMAGES];
int PreviewCount [MAX_WORKSPACE] [MAX_LAYOUTS_PER_WS];
int PostviewCount [MAX_WORKSPACE] [MAX_LAYOUTS_PER WS];
ImageSelectModes PreviewMode [MAX_WORKSPACE] [MAX_LAYOUTS_PER_WS];
ImageSelectModes PostviewMode [MAX_WORKSPACE] [MAX_LAYOUTS_PER_WS];
```

If many image sets are displayed in the same workspace and each begins on a new virtual page, then additional "page break" arrays such as ImageSetIndex may be used to find the virtual page where the image set begins. This is used to support traversal modes such as "previous chapter" or "next medical series in workspace". Array FrozenImages holds the layout information of each frozen image; arrays PostviewCount and PreviewCount describe the number of Post/Preview images in each workspace. Arrays PreviewMode and PostviewMode describe the criteria used to choose the images (e.g., no preview, previously seen, previously annotated, explicitly selected etc).

Generally speaking, the present invention pre-computes all layouts to the extent possible before image display. However, as discussed above, there are many situations (freezer, Pre/Post view) where additional layout computation is required at run-time as well. This is also accommodated by the present invention.

Floater images are treated as inhabiting a distinguished workspace. Array of WS[FLOATER_INDEX] and their positions specified in array LayoutInfo[FLOATER_INDEX]. One peculiarity is that details of workspace layout in ArrayofWS[FLOATER_INDEX] are ignored; instead a non-standard layout algorithm is used to control the movement and placement of the floaters, including such details as dragging across screens, which is implemented by changing the location of the selected images' LayoutInfo array elements.

The collage feature is similarly implemented, with a private workspace ArrayofWS[COLLAGE_INDEX] describing the workspace locations and size and actual positions of images described in LayoutInfo[COLLAGE_INDEX]. The collage workspace may be made visible or hidden on user-request. Typically, it is displayed in some default position (i.e., always appears on a user-selected screen) and with some default size (i.e., takes up the entire screen) but can also be customized to user-preferences.

As images are added to the collage, the sequence of initialized layout cells in LayoutInfo[COLLAGE_INDEX] is extended. The resolution at which collage images are visible may also be changed by the user.

In review mode, it is possible for the user to request re-display of selected workspaces with reduced image sets. The displayed image sets may have been previously selected by the user, or consist only of images that have had some annotation applied to them. In each case, the present invention determines the images to be re-displayed and uses the layout algorithm to generate a layoutinfo array with positions and virtual pages for the new image sets.

A workspace may be in lock-step synchrony with one or more workspaces. In such a case, whenever a certain image traversal (next, previous, first, last) operation is applied to one workspace, it is also propagated to its peer synchronized workspaces. Examples include a book display with multiple drafts of a text being compared, or two related sets of medical images being viewed (i.e., CT images with contrast and without contrast). Array SynchronizedWorkSpaces holds this information with all workspaces i with value SynchronizedWorkSpaces[i] equal being synchronized together.

int SyncronizedWorkSpace[MAX_WORKSPACE];

A more general mechanism for asynchronous inter-workspace communication is also supported. Workspace communication files, ws.commun.num, are used by all workspaces that need to communicate with workspace number num. Each workspace also sets a special callback on its own workspace file. This callback is invoked whenever data is added to the file. Each workspace will output an opcode of the form: Originating workspace number, operation, along with any other data (the equivalent of parameters to a subroutine) to the appropriate file whenever communication is required.

This general form of synchronization allows, for example, the display of both the table of contents of a book in a workspace and actual pages displayed in a separate workspace, with the sections and chapters currently visible highlighted. For another example, this implements a roadmap feature, where one workspace displays the entire set of images in overview mode with a second workspace displays a few images at full resolution, such that the overview workspace highlights the images visible at full resolution on the screen (or screens).

The system maintains state and traversal information on a per workspace basis. These data structures include, CurrentImageWithFocus which maintains information on which image the user is working on and CurrentWorkSpaceWithFocus which maintains the workspace the user has currently selected and CurrentLayoutNoForWS which indicates the currently active layout array.

```
Layout* CurrentImageWithFocus;
int CurrentWorkspaceWithFocus;
int CurrentLayoutNoForWS;
```

C. Image and Annotation Display

The Image and Annotation Display Software 66 layer is organized around an array of displayable images and a per-image annotation array.

```
DImage DisplayableImageArray [MAX_WORKSPACE] [MAX_LAYOUT_PER_WS] [MAX-
  _IMAGES];
AnnotatInfo AnnotatList [MAX_USER] [MAX_IMAGES];
SelectInfo SelectedImages [MAX_USER] [MAX_REVIEWS] [MAX_IMAGES]
```

The DImage record structure holds all the information relevant to the presentation of an image ("presentation properties") such as size, magnification factor, contrast and intensity, color, font, orientation, clip rectangle, etc. It may also be a pointer to the "raw" image data so that an image suitable for presentation can be quickly constructed. It may also hold an actual image ready for presentation (pixmap or XImage), so as to avoid re-computation at display time. Both options are supported by the present invention. Array DisplayableImageArray[k][j] holds all the images that are to be displayed in the j-th layout of the k-th workspace. When using Pre/Postview display techniques two distinct DisplayableImageArray entries may be simultaneously maintained to hold full size and miniature images for display.

All the annotation placed on image j is held by user number k in annotation list AnnotatList[k][j]. Observe that the same image may be presented in different forms through several DImage structures in different workspaces, but all the annotations for the image are held in one array of annotation array for that image. Annotations may be turned on and off and very small images (i.e., used in Post/Preview or collage) may have their annotations displayed in summarized or miniature forms. Any annotation added to any visible DImage representation of an image is propagated to all DImage displays of the image.

SelectedImages array which maintains information on all the images which each user has explicitly selected (image set no, image no, workspace no, presentation properties, time stamp, etc). Each user may create many such review sets, each perhaps labelled by a name ("For Patient", "For Pat R.", "Review Set Aug. 1, 1995"etc.). Each review set may be displayed using the standard workspace configurations or displayed using the collage workspace or even as miniatures using Pre/Postview display.

The display software provides tools to edit and change all presentation properties of images at run-time and add and delete annotations from images. Images may also be displayed with only annotations from selected users made visible or with all annotations hidden.

D. Raw Image Data

The final piece of information needed to complete the description of the run-time state is the array of "raw images" being displayed together with some description of the file system location(s) from which the initial information was obtained. These are maintained in structures:
ImageStruct Images[MAX_IMAGES];
FileInfo FileHandle;
Type ImageStruct holds the initial data together with other identifying information (e.g., image set no, time and date when the image was obtained). Type FileInfo contains all information concerning the file system location from which the images were obtained.

E. Initialization and Visual State

At run-time, all the data-structures described above are maintained in single record called RunTimeState. The contents of RunTimeState comprise the workstation visual state and serve to describe the system in execution at any point in time (e.g., a snapshot of the system).

An initialize sub-routine 68 is available which takes the following information and initializes RunTimeState making the system ready for execution. This information includes:

valid FileHandle value(s);
values for ArrayofWS, TotalWorkSpaceCount, ForwardbackCount, BackwardCount, PreviewCount, PostviewCount, PreviewMode, PostviewMode;
description of the image sets to be placed in each workspace, description of the layout constraints for each image set and a description of the presentation properties for each image set or each image. This is used to initialize DisplayableImageArray;
information on annotation that may have been previously made and stored on a per-user and per-image basis. This is used to initialize AnnotatList structure. This information is optional and need not be provided. In such a case, the AnnotatList structure is initialized to empty;
information on selections which have previously been made and stored on a per-user basis. This is used to initialize the SelectedImages array. This information is optional and need not be provided. In such a case the SelectedImages list is set to empty; and
names and positions of any tools required by the user.

Once this information is available, the initialize routine 68 reads in the raw image data into Images, invokes the appropriate layout algorithms and further initializes the DisplayableImageArray. The initialize routine also communicates with the underlying windowing system about any additional tools or clients the user may have requested. The system is now ready for interaction with the user.

(ii) Layout Algorithm for Image Placement in a Workspace

The above description of a generic imaging system provides the environment in which the present invention operates. The layout algorithm sets up the image display format and places the images to be viewed into this format.

A. Algorithm Inputs

Inputs to the layout algorithm include the following fully initialized data structures:

workspace description: Includes SegmentCount describing total number of segments and an array of Segment records with fields Segment[i].Width, Segment[i].Height and Segment[i].ScreenInfo.

image description: Includes ImageCount with total number of images and array ImageSize of records with fields ImageSize[i].Height, ImageSize[i].Width.

Layout Constraints:
  ForwardCount and BackwardCount integers describing number of images to be moved out of a page when going forward or back.
  Array FrozenImageLocation of records with fields Xpos, Ypos, Height, Width, ScreenInfo specifying position, size, and screen information for frozen images.
  boolean array PageBreakImages with j=PageBreakImages[i] set to true indicating that image j must be placed at the beginning of a page.
  Integer Preview and Postview counts specifying number of images.
  Typically, these values are powers of 2,3, ... (i.e., images are displayed at 50%, 33%, ... magnification etc.

mode: one of the following: stack, frame, 3D, overview, Pre/Post, page.

B. Algorithm Outputs

Output from the algorithm consists of a fully initialized OneLayout array with fields ImageNo, Xpos, Ypos, Height, Width, ScreenInfo specifying position, size and screen information for images as well as an integer LayoutCount value. Additionally, the algorithm initializes array VirtualPageForLayout of records with VirtualPageForLayout[i] specifying start and stop indices for page i.

C. Basic Layout Algorithm

In this algorithm, assume that ForwardCount and BackwardCount are set to the same value. FIG. 5 is a flow chart 100 of this algorithm.

1. If mode==stack (step 102) then, display all the images overlaid upon each other in a single segment. Generally, this is usually the first segment of the workspace. Check to see if each image described in ImageSize array fits within Segment[1] (step 104). If some image has a larger size, then exit with message "Layout Allocation Failed" (step 106). Otherwise, we execute the following loop (step 108):

```
LayoutCount = 1;
i = 1;
while (i <= ImageCount) do
OneLayout [LayoutCount] .Xpos = (Segment [1]. Width − ImageSize [i]−.Width)/2;
OneLayout [LayoutCount] .Ypos = (Segment [1] .Height −ImageSize [i]−.Height)/2;
OneLayout [LayoutCount] .ImageNo = i;
OneLayout [LayoutCount] .ScreenInfo = Segment[1] . ScreenInfo;
OneLayout [LayoutCount] .Height = ImageSize [i] .Height;
OneLayout [LayoutCount] .Width = ImageSize[i] .Width;
VirtualPageForLayout [LayoutCount] .start =
VirtualPageForLayout [LayoutCount] .stop =
LayoutCount;
LayoutCount = LayoutCount + 1; i = i + ForwardCount;
end of while loop
```

Now layout is complete for stack mode, and the layout algorithm exits. If the mode is selected to be something other than stack mode, the algorithm continues:

2. Set magfactor=1 (step 110).
   if (mode==overview) (step 112) then set magfactor to a selected reduction fraction between 0 and 1 (step 114). Typically, magfactor is chosen so that all images are visible on a single page. However, if this reduces image size below some arbitrary user-specified lowerbound (i.e., 64 by 64 pixels) a magfactor is chosen that ensures that the smallest image is never less than the specified bound (i.e., 64 by 64) and display images on multiple pages.
3. if (mode==Pre/Post)(step 116) then (1) verify that all images described in ImageSize array are of the same size (step 118), if not, exit with message "Pre/Post View require Images of Equal Size" (step 120) and (2) set PreMagFactor and PostMagFactor based on Preview and Postview using the following table (step 122):

| Preview or Postview Value | Pre MagFactor or Post MagFactor Value |
|---|---|
| 4 | 50% |
| 9 | 33% |
| 16 | 25% |
| 25 | 20% |

4. Set NextPage=NextImage=NextSegment=LayoutCount=1 (step 124) and begin frame-style layout (common to page, 3D, frame, Post/Pre, Overview).

5. (D): While NextImage<=ImageCount (step 126) do
6. Set PageStart=LayoutCount (step 130). This determines which image is the starting image on the page.
7. (C): While NextSegment<=SegmentCount (step 132) do
8. Layout maximal number of images in current segment, with images laid out in rows. Set NextXpos=0 and NextYpos=0 (step 134).
9. (B): While (NextYpos<=Segment[NextSegment].Height+ImageSize[NextImage].Height) (step 136) do
10. Set MaxHeight=0 (step 138).
11. (A): While (NextXpos<=Segment[NextSegment].Width+ImageSize[NextImage].Width) (step 140) do Steps 9–11 determine if an image fits into the particular segment. The image is ready to be displayed unless special conditions exists. Thus, we check for all special cases:

Check FrozenImageLocation (an image is reserved in a particular position) array to see if this position in this segment is already occupied (step 142). If so, increment NextXpos, NextYpos with frozen image height and width (step 144) and continue to Step 12.

Check PageBreakImages array to see if image number NextImage is a page break image (step 146). A new page will start with this image. If so, check if NextSegment==1 and NextXpos==0 AND NextYpos==0 (step 148) then continue with step 12. Otherwise, note that the previous page has ended and reset variables (step 150):

```
begin VirtualPageForLayout[NextPage].start = PageStart;
VirtualPageForLayout[NextPage].stop = LayoutCount −1;
NextPage = NextPage+1;PageStart = LayoutCount
NextSegment = 1; NextXpos = NextYpos = 0;
end
```

That is, if a new page begins, perform the layout set up. If no other special conditions exists, continue at Step 12.

Check next special condition. Do Preview layouts in the first position need to be generated? A preview is an area of the workspace displaying one or more previously viewed images.

```
Check if (Preview >= 1) AND (NextSegment == 1) AND
(NextYpos == 0) AND,
(NextXpos == 0) AND ((NextImage − Preview) > 1) (step
152) then
PreviousImages = NextImage;
for i = 1 to sqrt(Preview) do
for j = 1 to sqrt(Preview) do
begin
OneLayout[LayoutCount].Xpos = NextXpos;
OneLayout[LayoutCount].Ypos = NextYpos;
OneLayout[LayoutCount].ImageNo = PreviousImages;
OneLayout[LayoutCount].ScreenInfo = Segment-
[NextSegment].ScreenInfo;
OneLayout[LayoutCount].Height =
ImageSize[PreviousImages].
Height*PreMagFactor;
OneLayout[LayoutCount].Width = ImageSize[PreviousImages].
Width*PreMagFactor;
NextXpos = NextXpos +
(i−1)*PreMagFactor*ImageSize[PreviousImages].Width;
NextYpos = NextYpos +
(j−1)*PreMagFactor*ImageSize[PreviousImages]
.Height;
LayoutCount = LayoutCount + 1; PreviousImages =
Previous Images − 1
end of for loops
```

-continued
```
NextImage = Next Image + 1 (step 154);
goto end of while loop (A).
```

12. Perform a standard allocation of the image in this segment (step 156):

```
        OneLayout[LayoutCount].Xpos = NextXpos;
        OneLayout[LayoutCount].Ypos = NextYpos;
        OneLayout[LayoutCount].ImageNo = Next Image;
        OneLayout[LayoutCount].ScreenInfo = Seg-
        ment[NextSegment].ScreenInfo;
        OneLayout[LayoutCount].Height =
        ImageSize[NextImage].Height
        OneLayout[LayoutCount].Width =
        ImageSize[NextImage].Width;
        NextXpos = NextXpos +
        ImageSize[NextImage].Width*MagFactor;
        NextYpos = NextYpos +
        ImageSize.[NextImage].Height*MagFactor;
        LayoutCount = LayoutCount + 1;
        NextImage = NextImage + 1
        if (NextImage > ImageCount) (step 158) then note last
        page break and exit, layout algorithm is complete (step
        160).
```

13. if (MaxHeight<ImageSize[NextImage-1].Height (step 162)) then MaxHeight=ImageSize[NextImage-1].Height (step 164). These steps determine the highest image on the page.
14. end of while loop (A)
15. Set NextXpos=0; NextYpos=NextYpos+Maxheight; MaxHeight=0 (step 166). This sets up a row of images in the proper location based on the previous row's height.
16. end of while loop (B). Processes next row of images.
17. Set NextSegment=NextSegment+1 (step 168)
18. end of while loop (C); we need to start a new virtual page
19. Check to see if (Postview>=1) AND ((NextImage–1+Postview)<=ImageCount) (step 170) then if so, we must replace the last image with postview images. A Postview is an area of the workspace displaying one or more upcoming images which have not yet been viewed.
20. Check FrozenImageLocation to see if there is a frozen image in the last image position (step 172); if so skip the next step and continue to Step 20A. FrozenImageLocation may preempt a Postview image.
Undo last image layout and replace with Postview images begin Postview layout (step 174).

```
NextXpos = NextXpos -
  ImageSize[NextImage-1].Width*MagFactor;
NextYpos = NextYpos -
  ImageSize[NextImage-1].Height*MagFactor;
NextImage = NextImage -1; LayoutCount = LayoutCount -1;
PostImages = NextImage;NextImage = NextImage+1;
for i = 1 to sqrt(Postview) do
for j = 1 to sqrt(Postview) do
begin
    OneLayout[LayoutCount].Xpos = NextXpos;
    OneLayout[LayoutCount].Ypos = NextYpos;
    OneLayout[LayoutCount].ImageNo = PostImages ;
    OneLayout[LayoutCount].ScreenInfo = Segment-
    [NextSegment].ScreenInfo;
    OneLayout[LayoutCount].Height =
    ImageSize[PostImages].Height*Post
    MagFactor;
    OneLayout[LayoutCount].Width =
    ImageSize[PostImages].Width*PostMagFactor;
    NextXpos = NextXpos +
    (i-1)*PostMagFactor*ImageSize[PostImages].Width;
    NextYpos = NextYpos +
    (j-1)*PostMagFactor*ImageSize[PostImages].Height;
    LayoutCount = LayoutCount + 1; PostImages = PostImages +
    1
end
```

21. Update the page count and reset variables (step 176). Go to the next page.

```
VirtualPageForLayout[NextPage].start = PageStart;
VirtualPageForLayout[NextPage].stop = LayoutCount -1;
NextPage = NextPage+1; PageStart = LayoutCount;
NextSegment = 1;
```

22. end of while loop (D)

For an example, if the algorithm of FIG. 5 is performed using the following input values:

```
SegmentCount = 2;
Segment[1].Width = Segment[2].Height = Segment[1].Width = Seg-
ment[2].Height = 600;
Segment[1].ScreenInfo = 1; Segment[2].ScreenInfo = 2;
ImageCount = 5;
Each Image is of Size 512 by 512;
ForwardCount = BackwardCount = 1;
Preview = 4;Postview = 1;
Arrays FrozenImageLocation and PageBreakImages are empty
```

Figure 4:
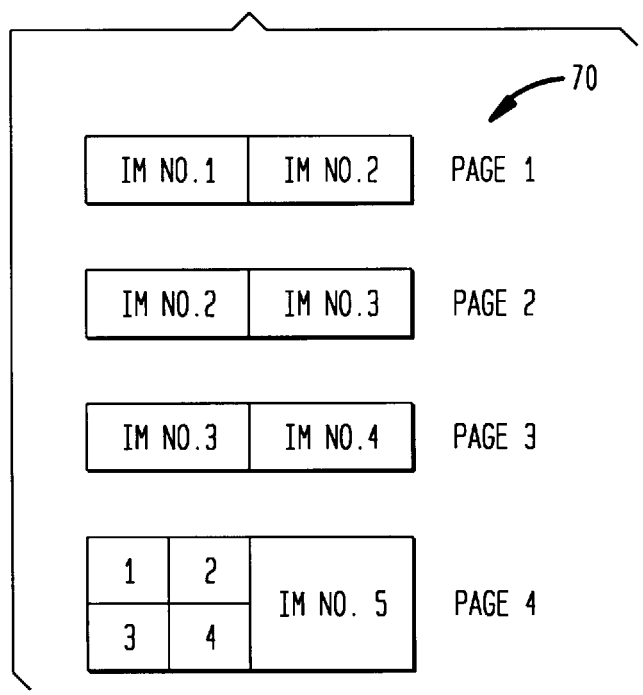
FIG. 4 is an illustrative output display of a hardware configuration using the present invention.
Figure 5A:
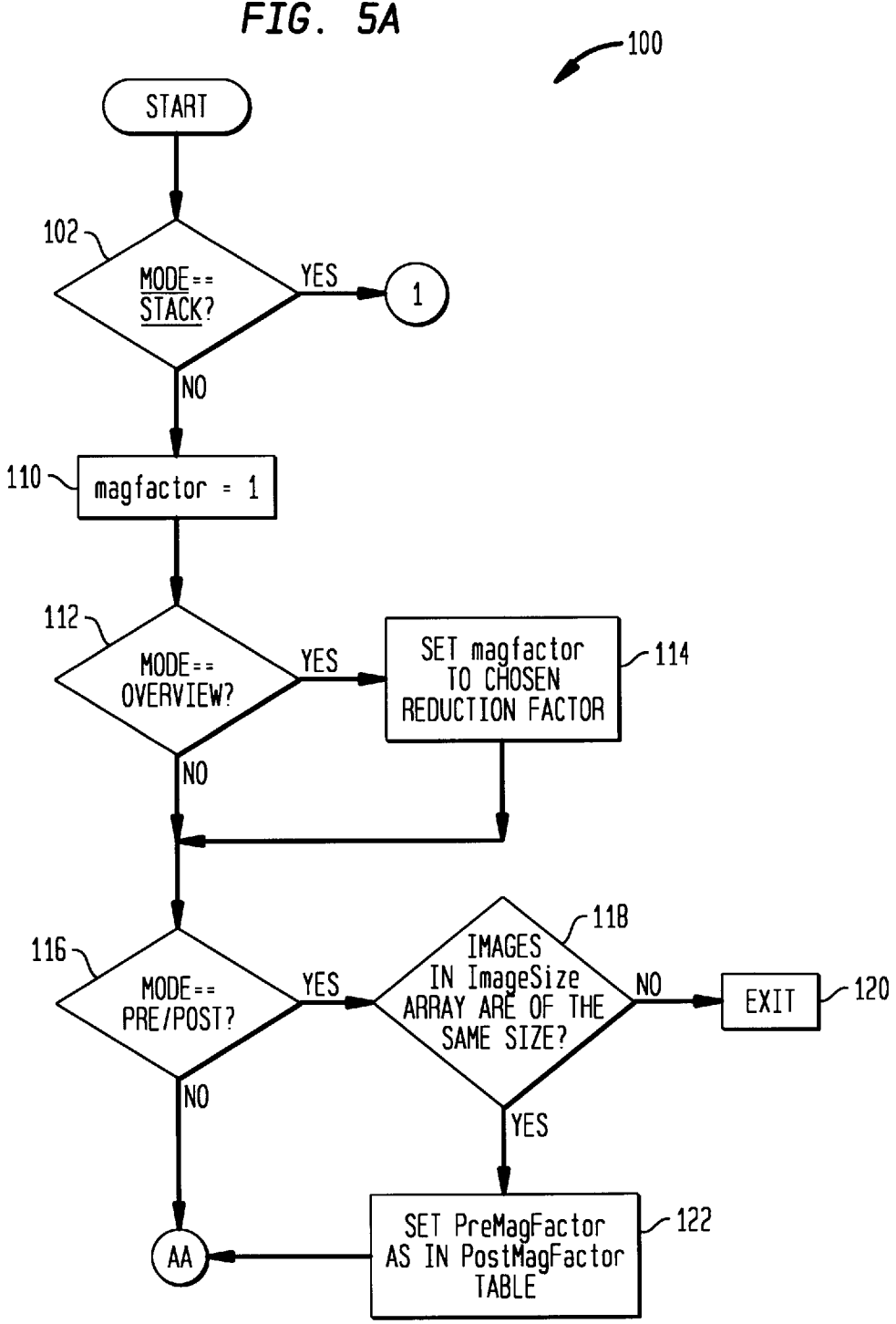
Figure 5B:
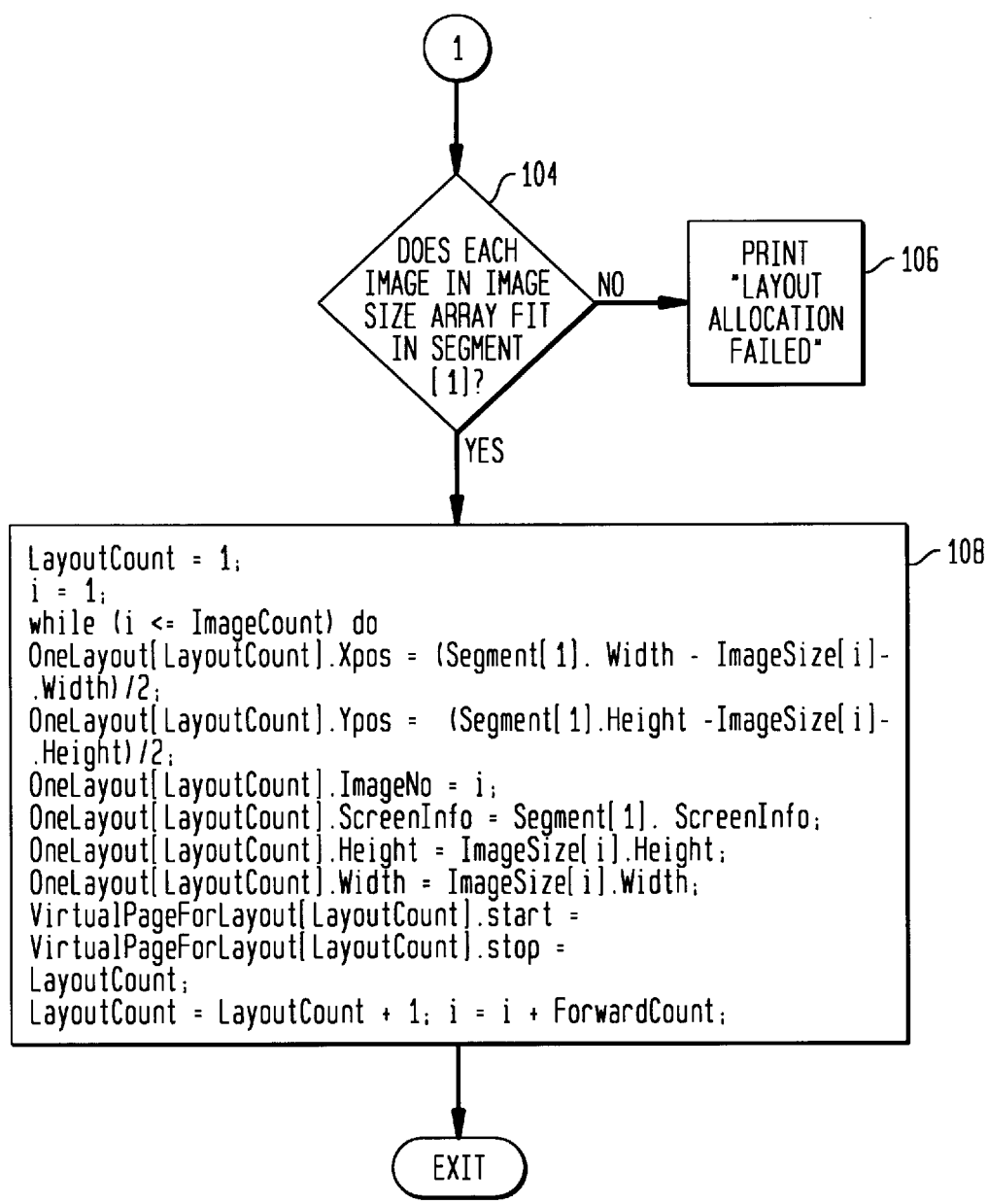
Figure 5C:
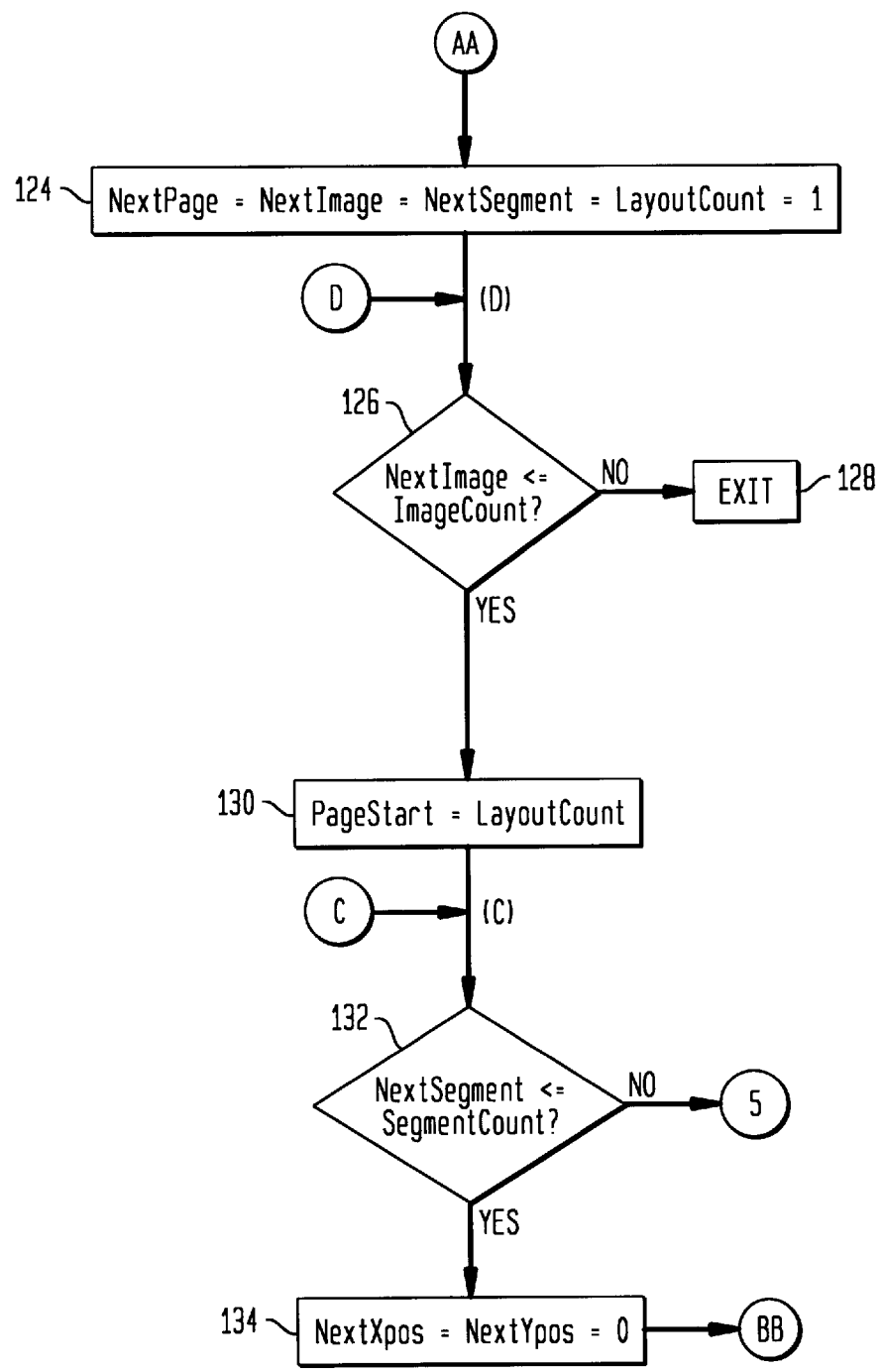
Figure 5D:
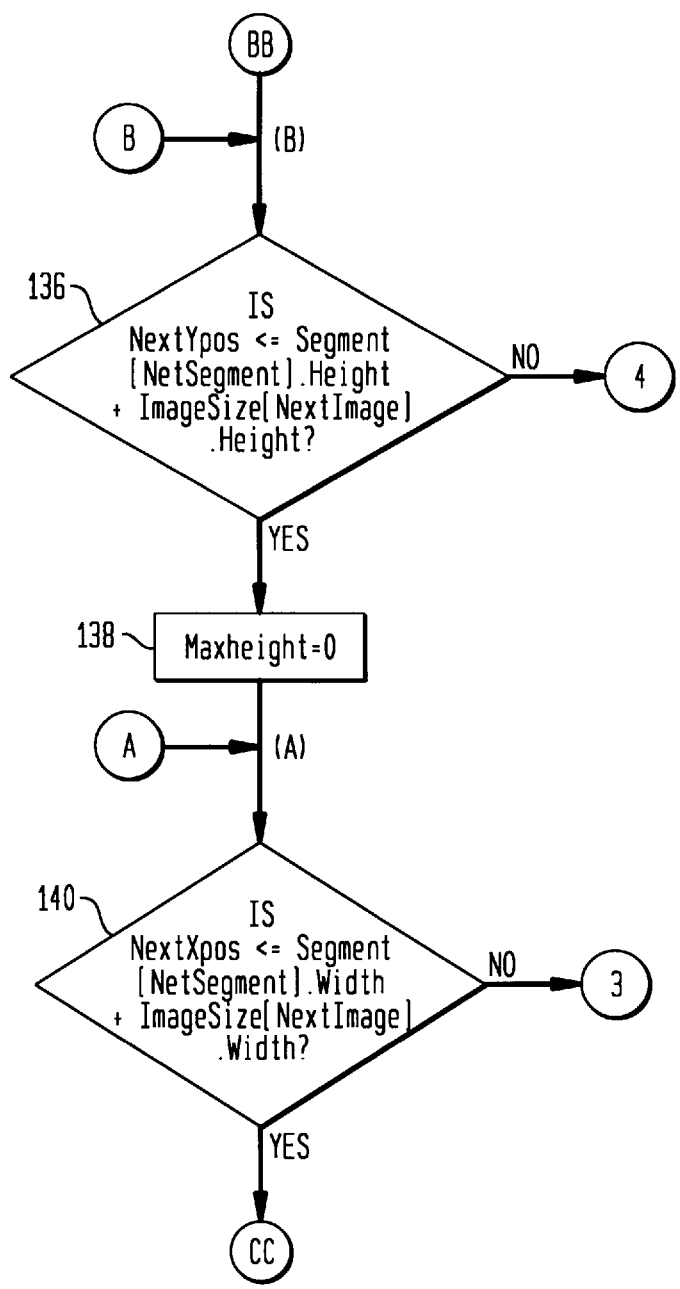
Figure 5E:
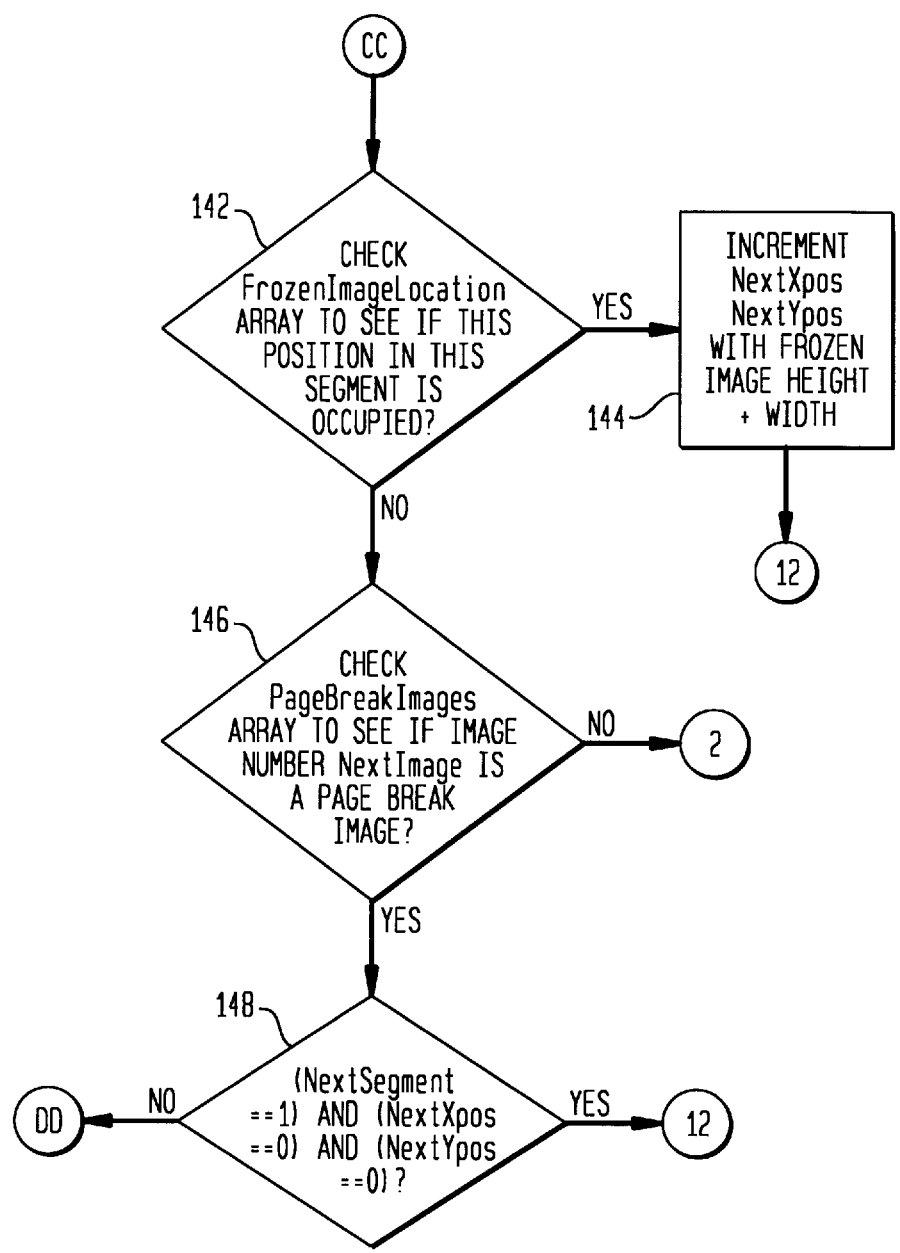
Figure 5F:
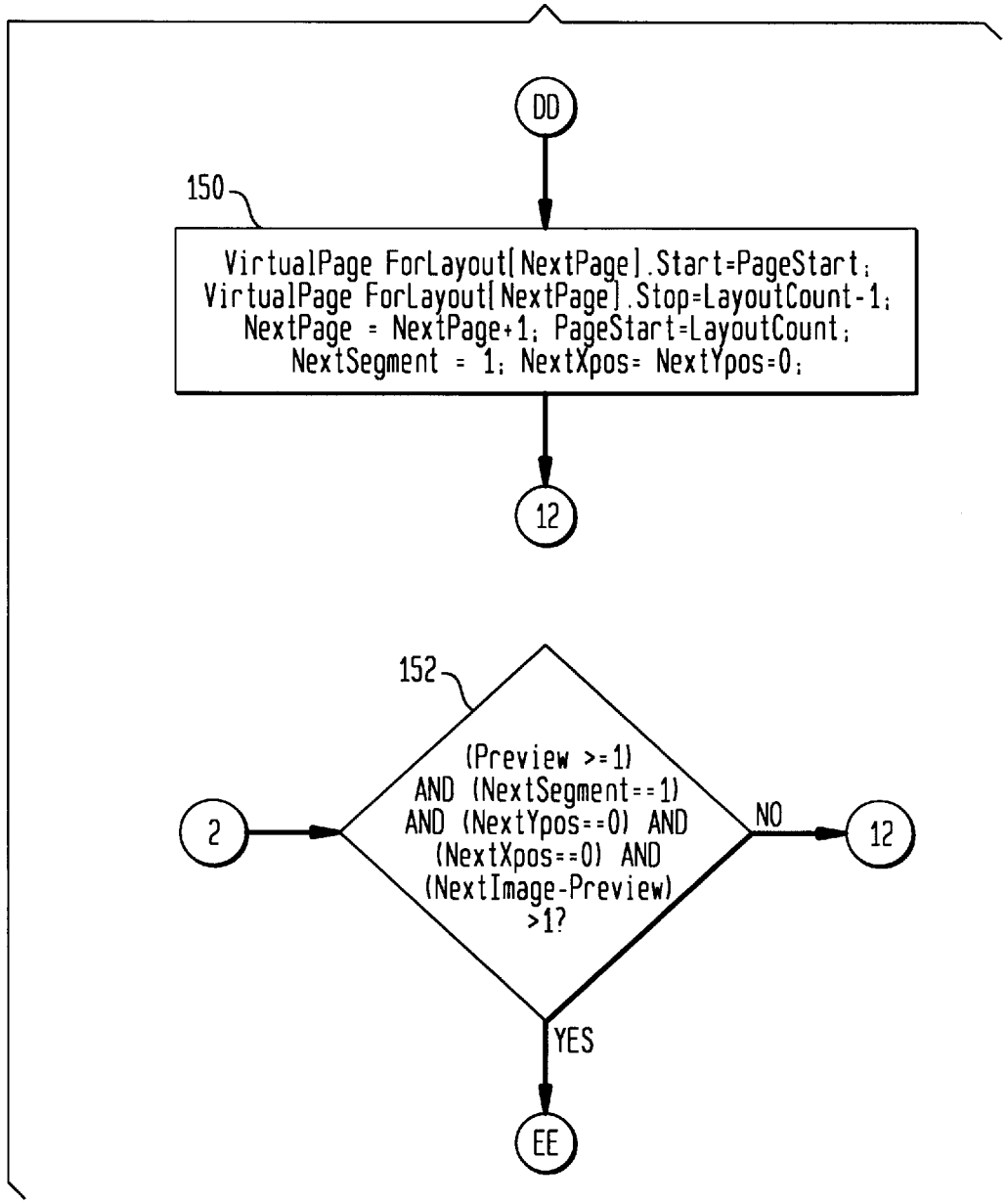
Figure 5H:
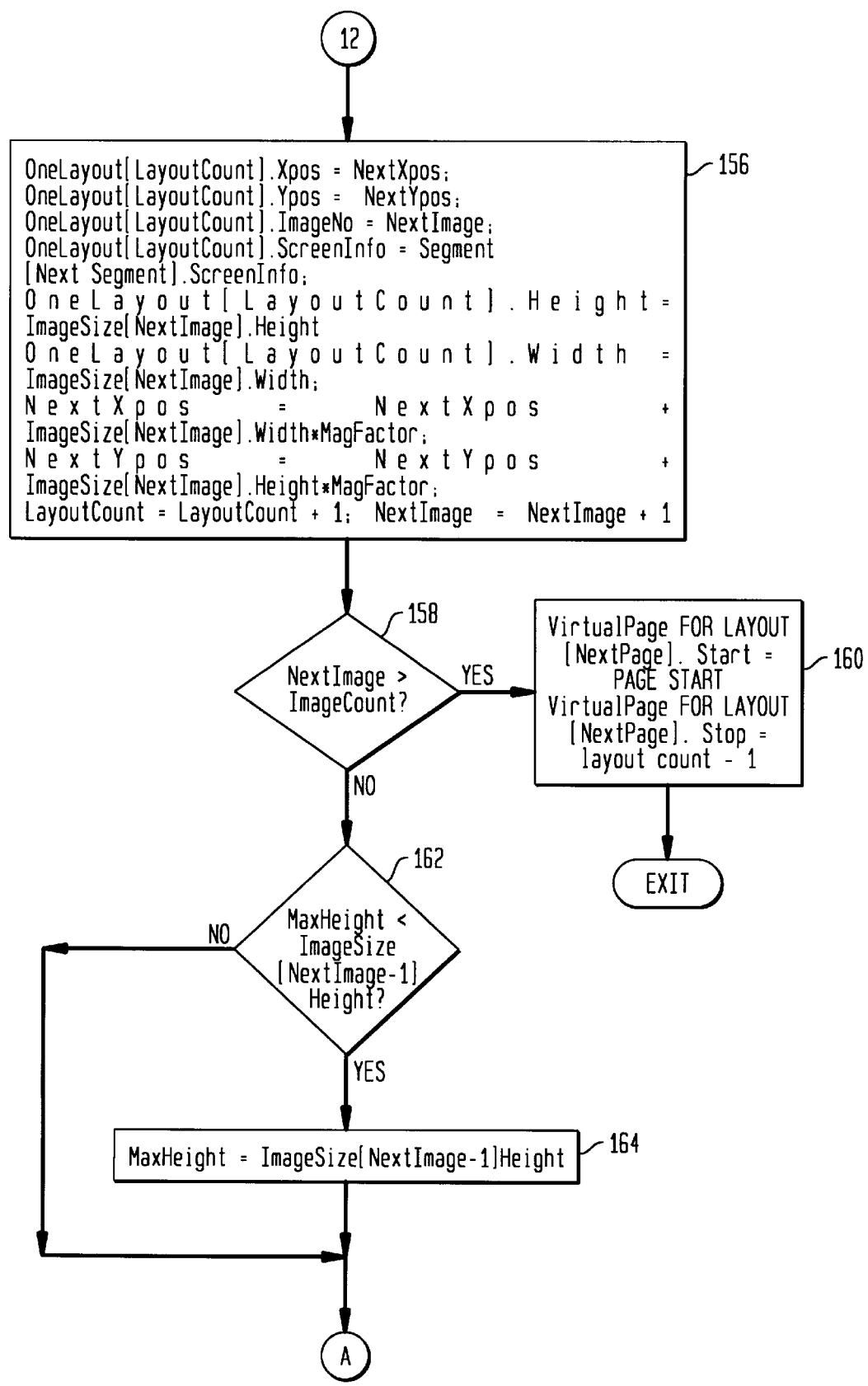
Figure 5I:
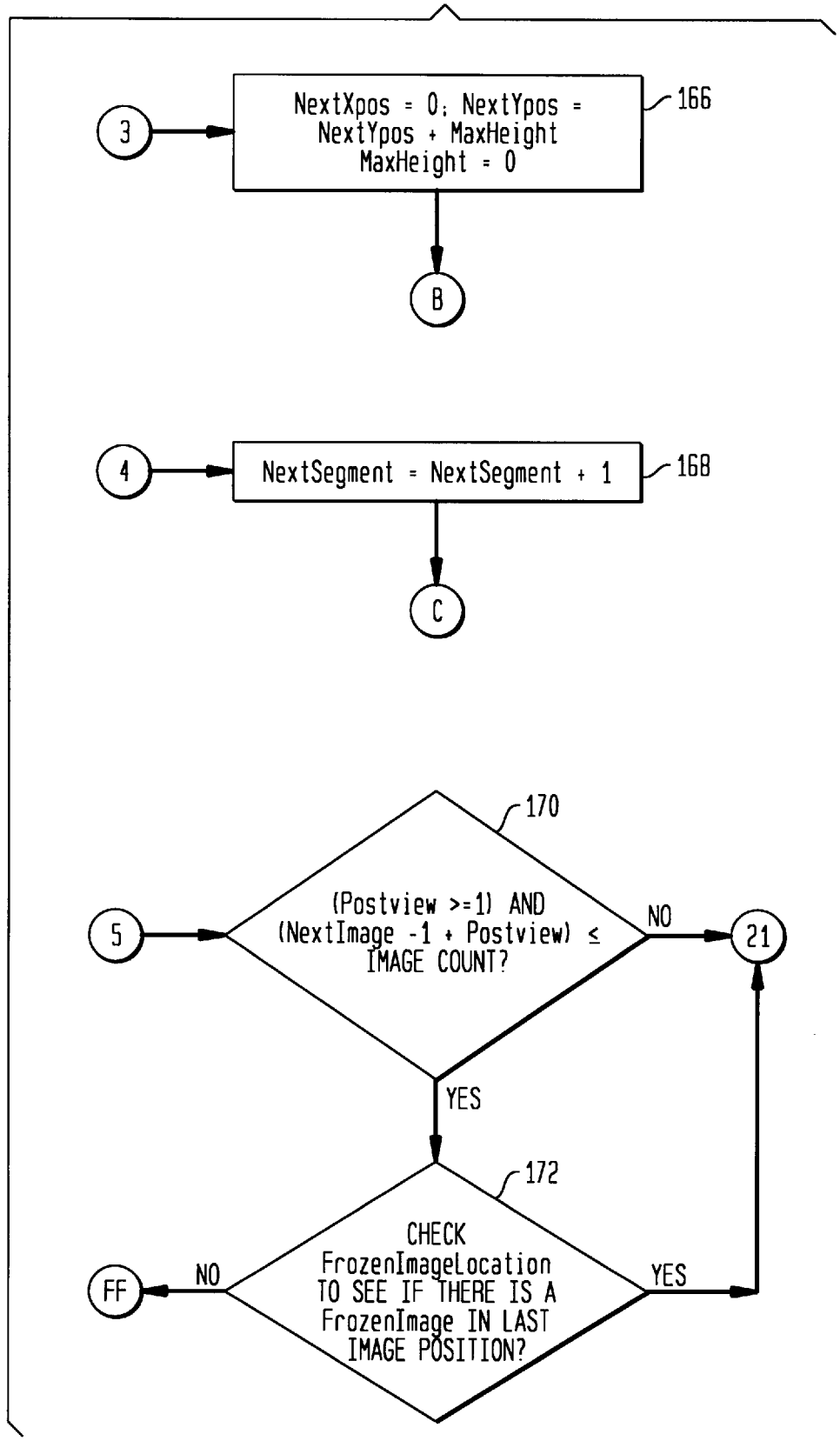
Figure 6C:
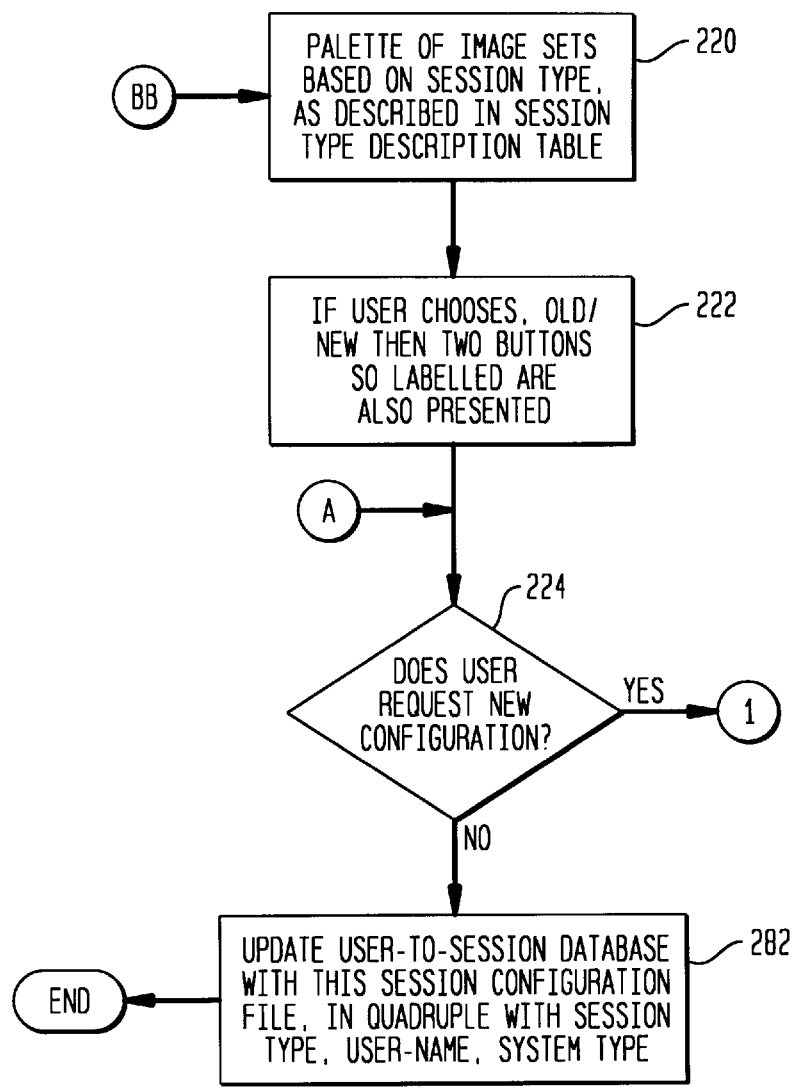
Figure 6D:
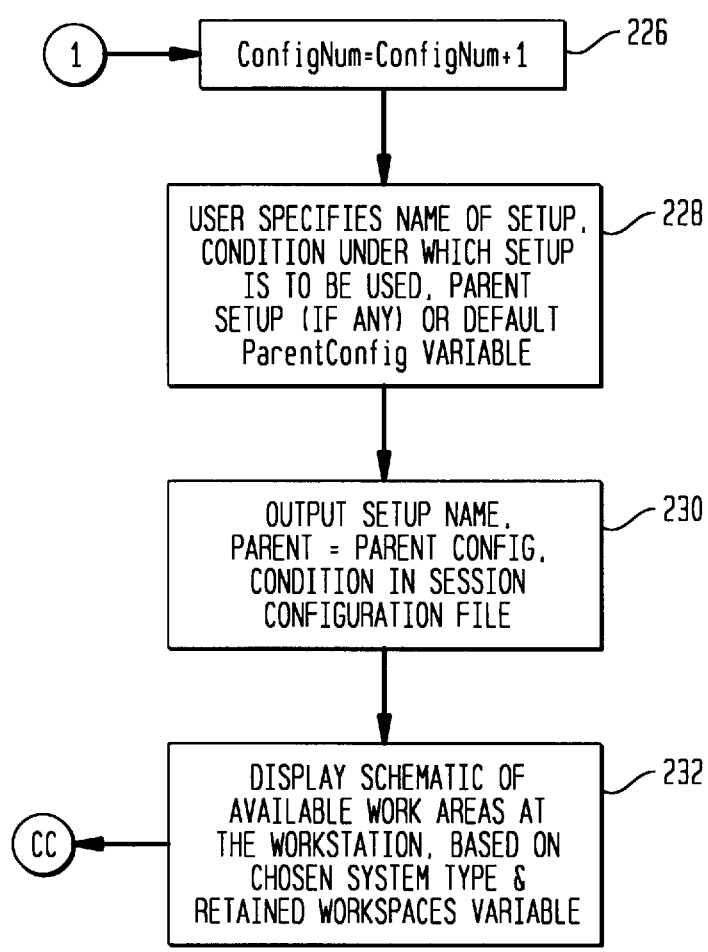
Figure 6E:
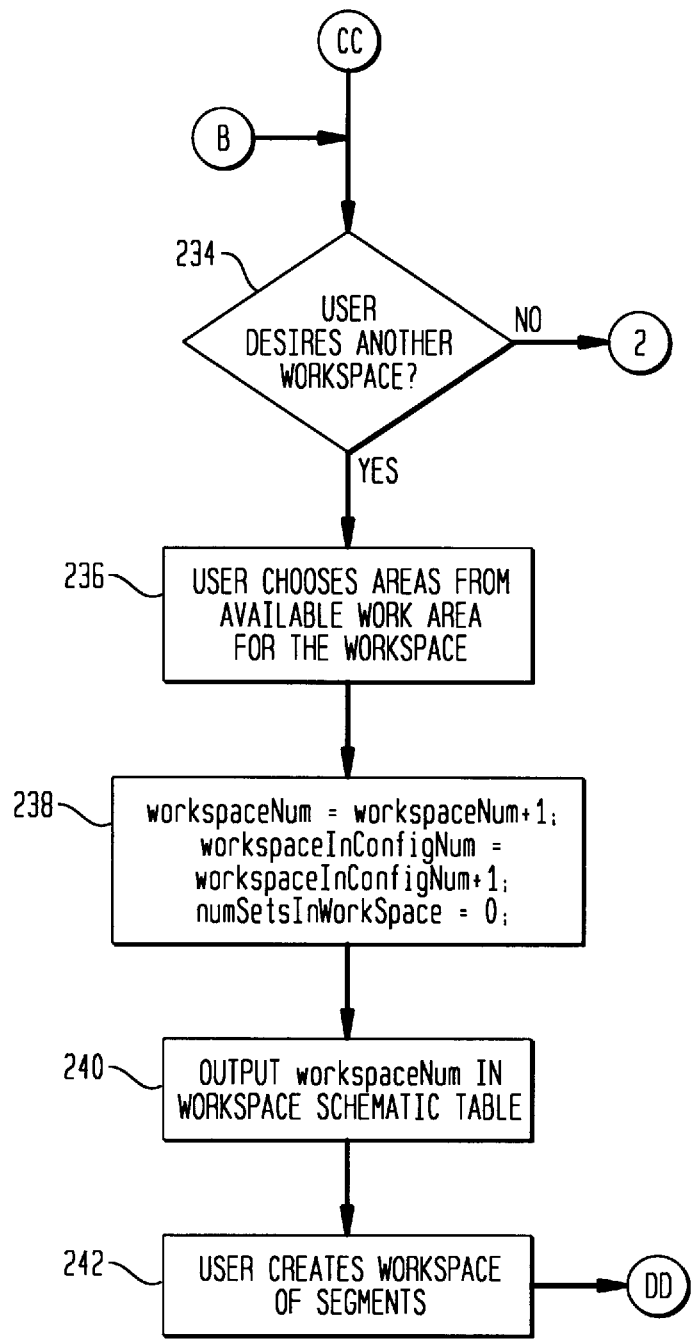
Figure 6F:
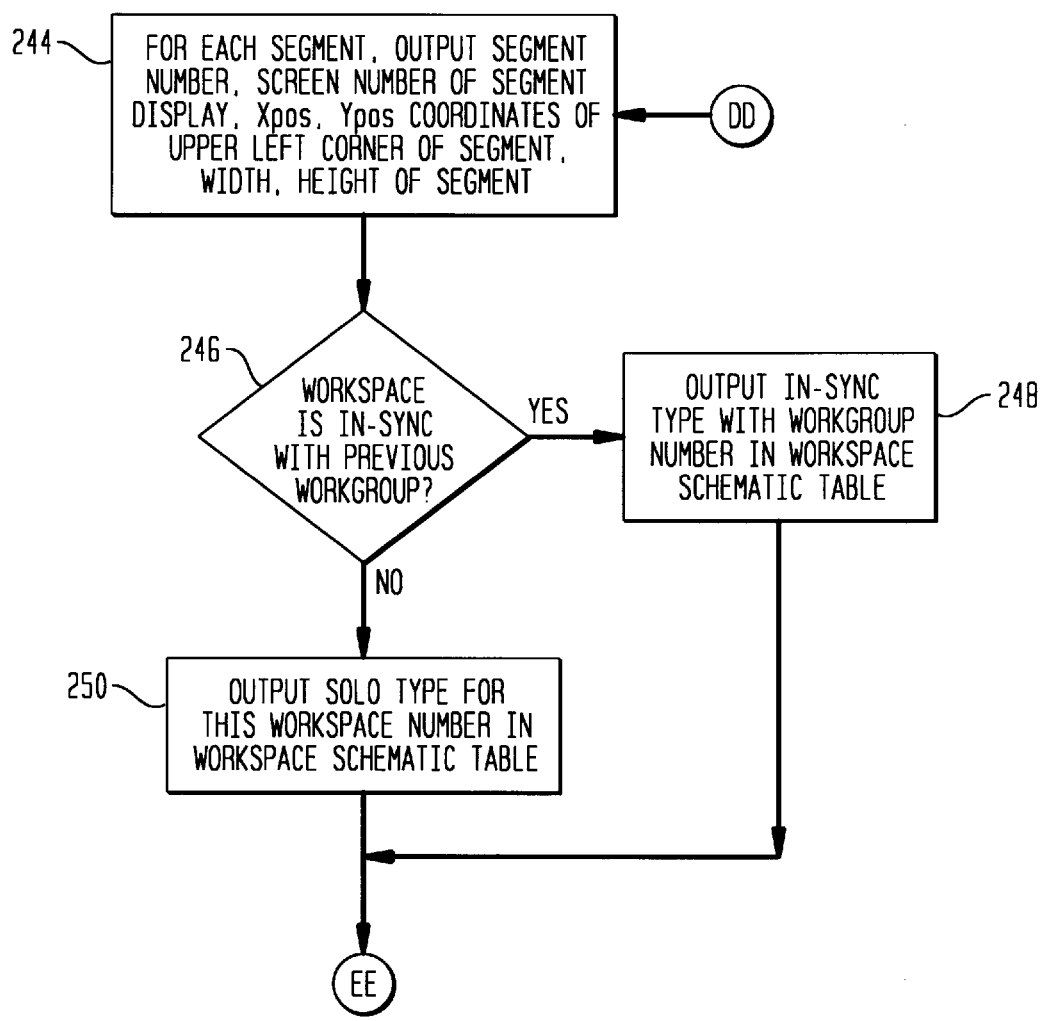
Figure 6G:
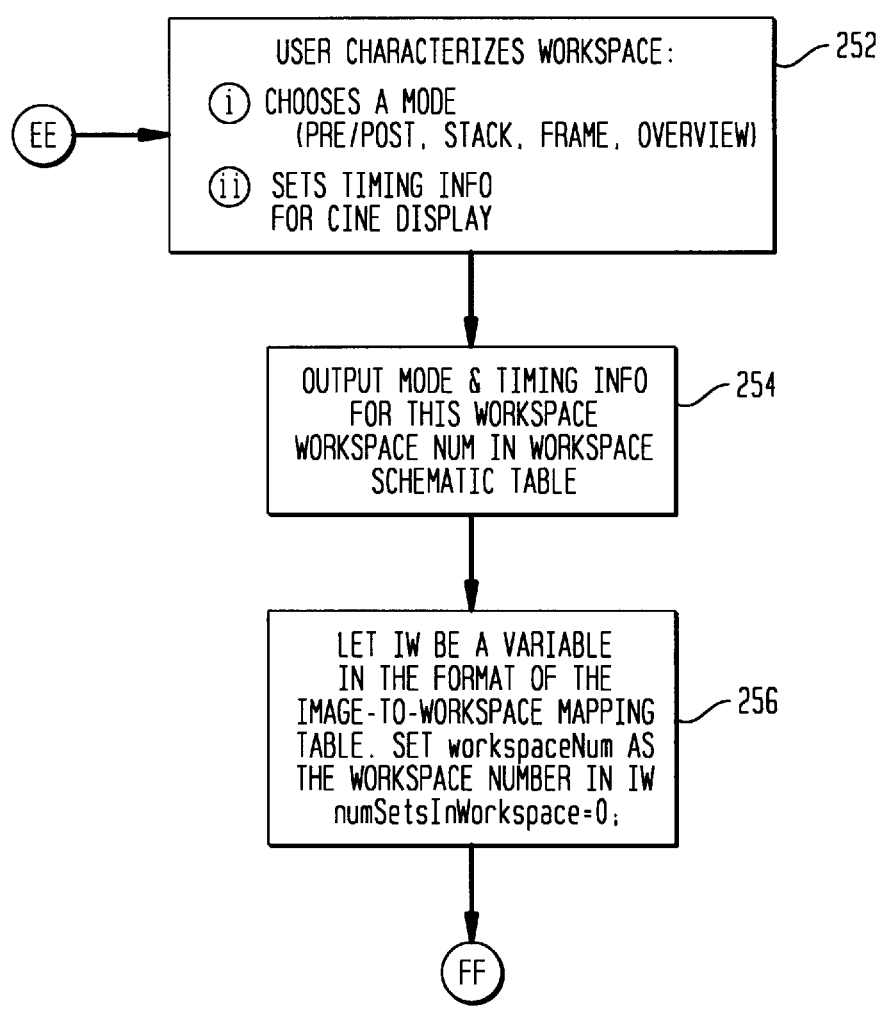
Figure 6H:
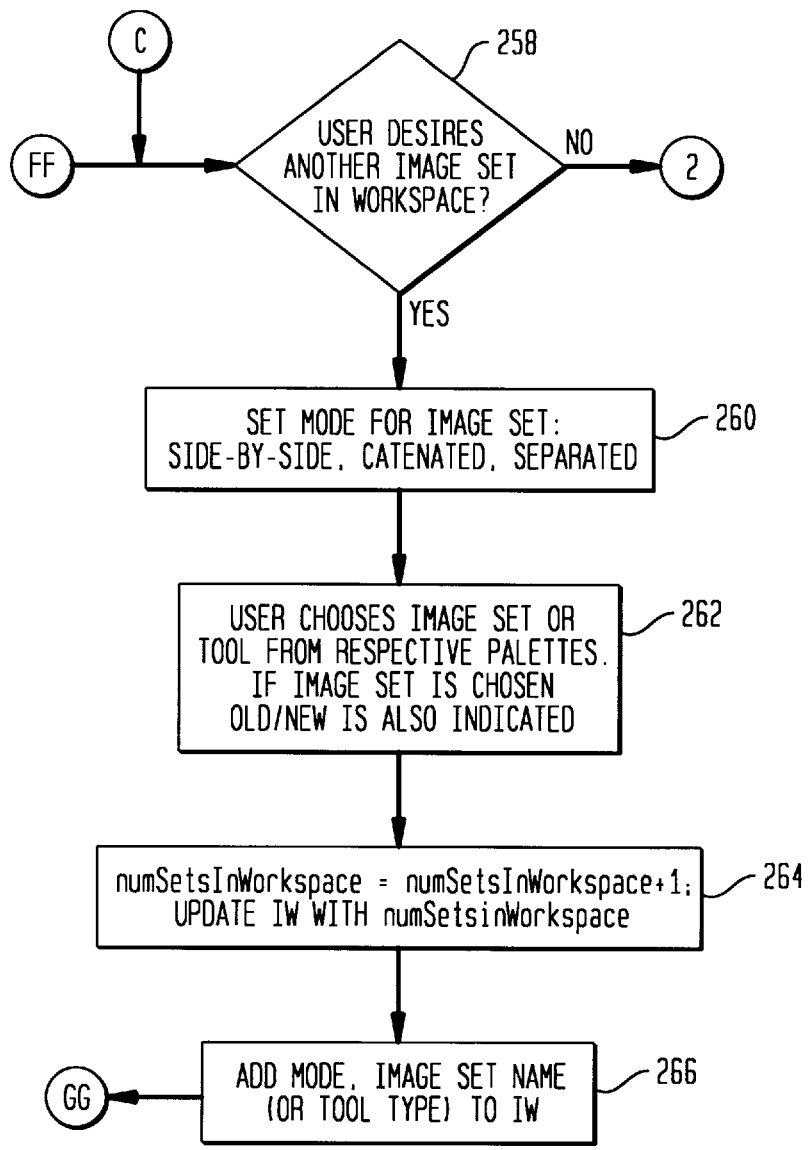
Figure 6J:
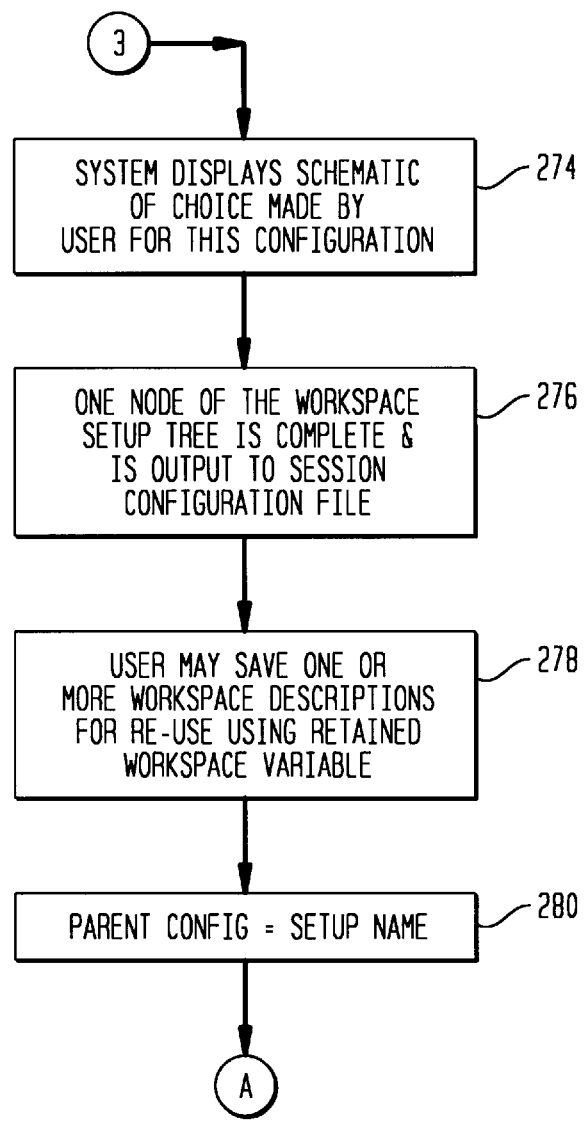
Figure 7B:
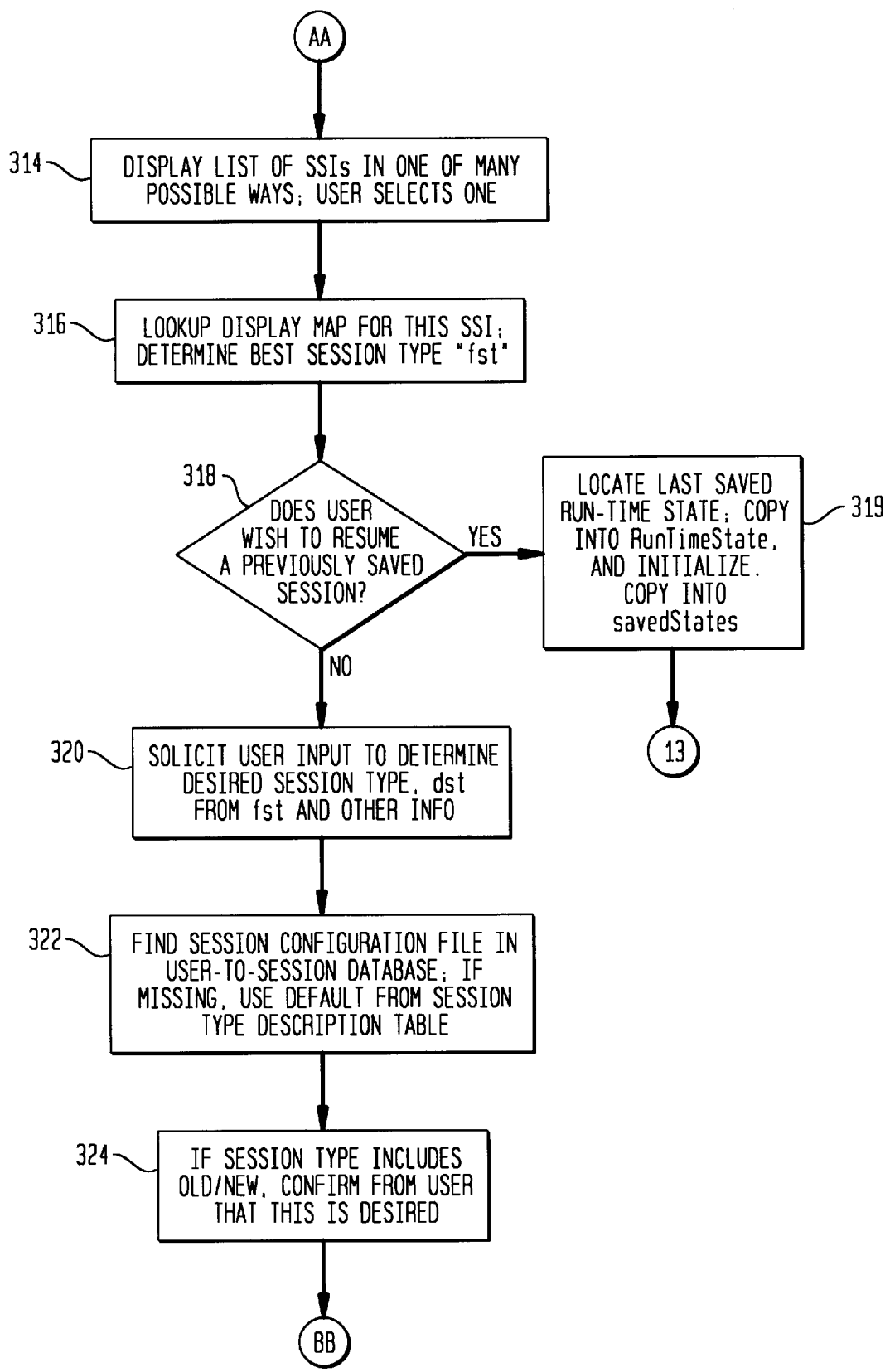
Figure 7D:
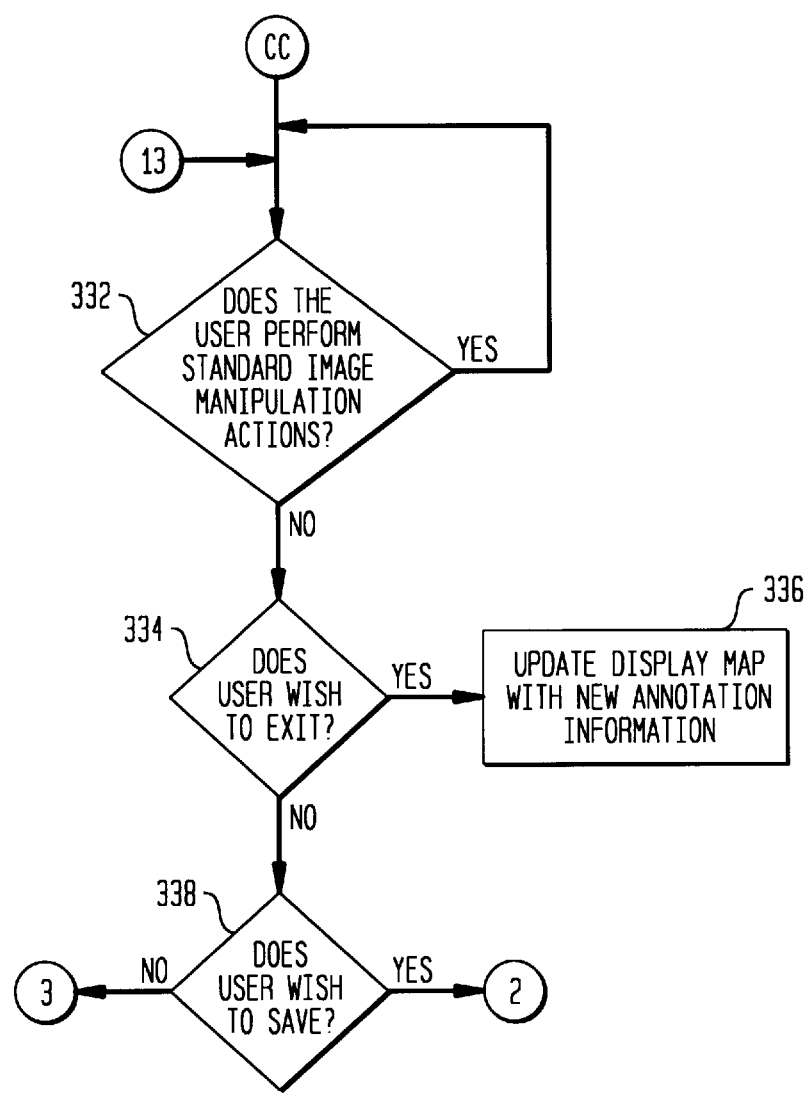
Figure 7E:
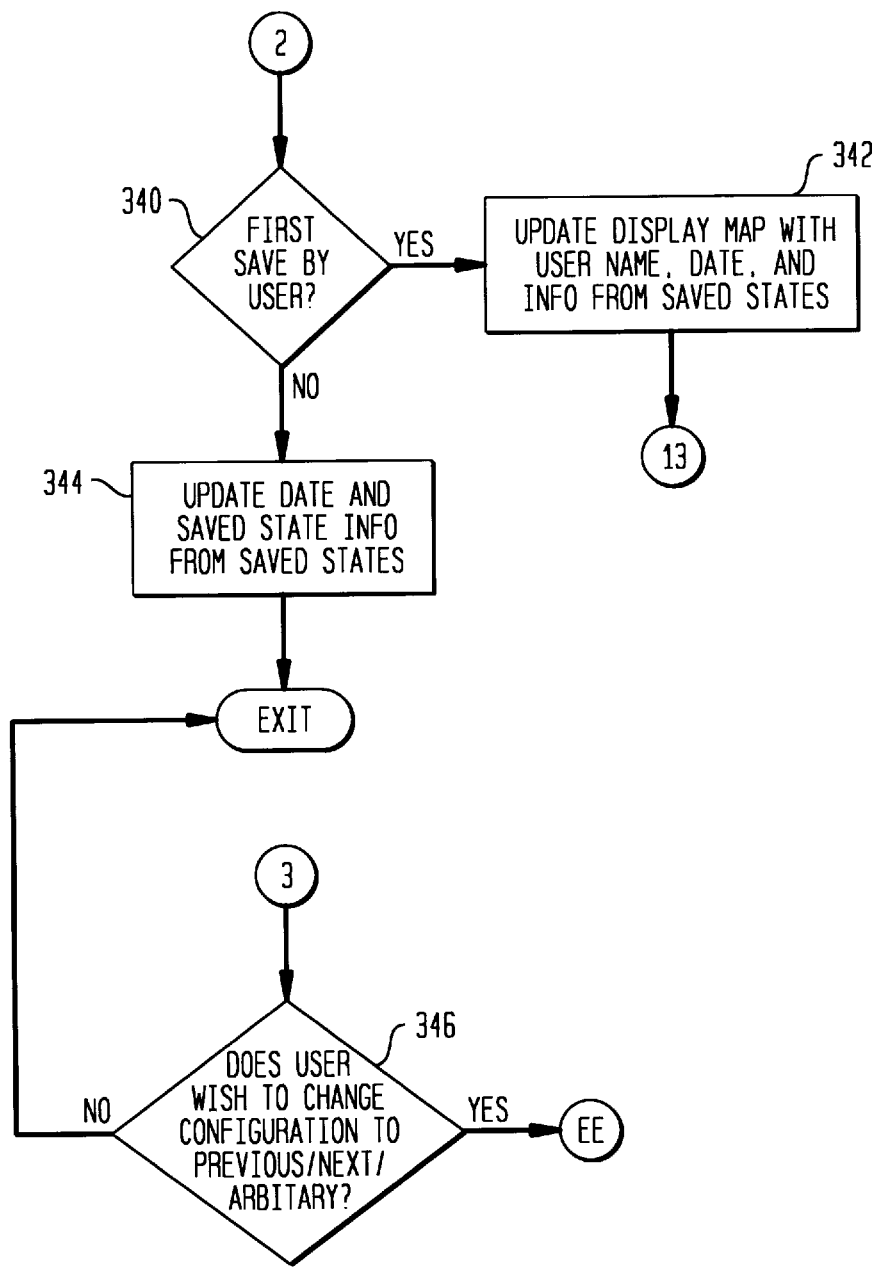
Figure 7F:
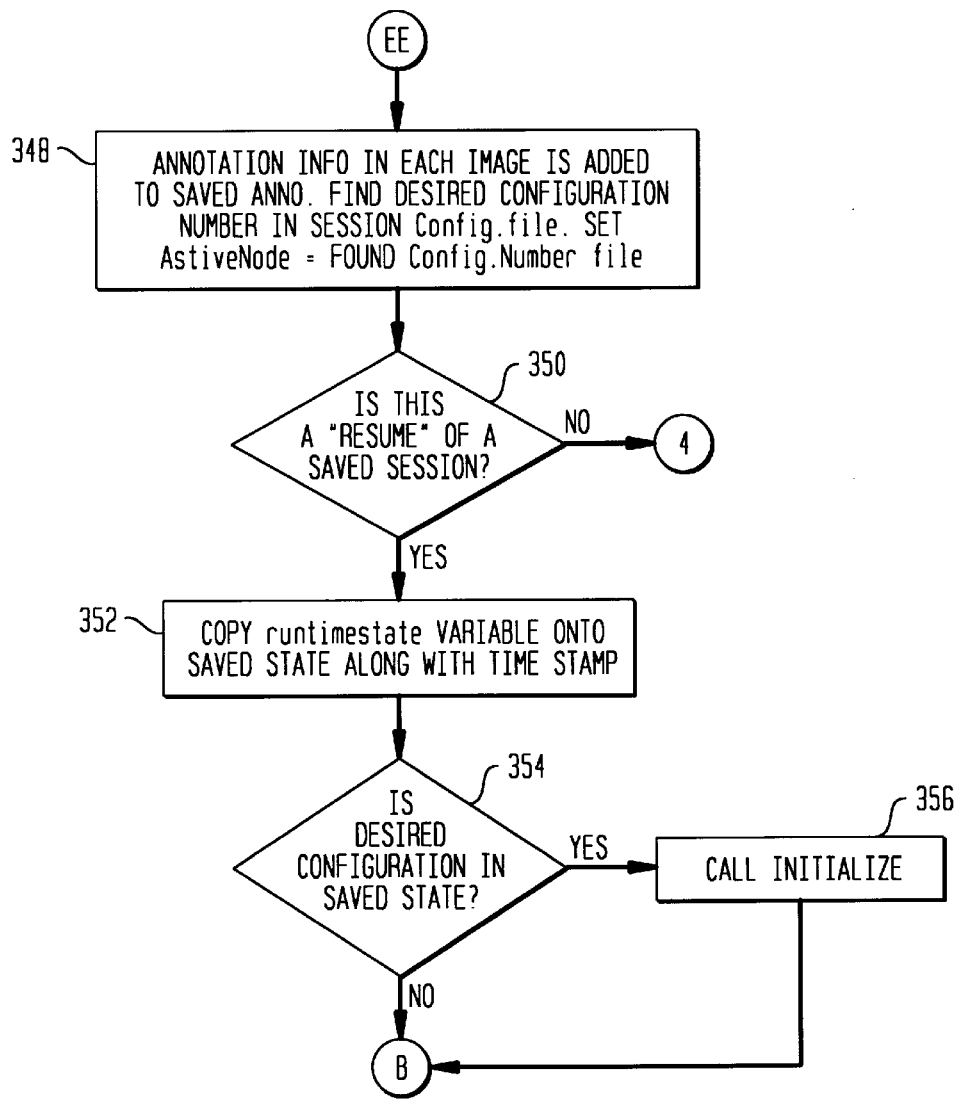
Figure 7G:
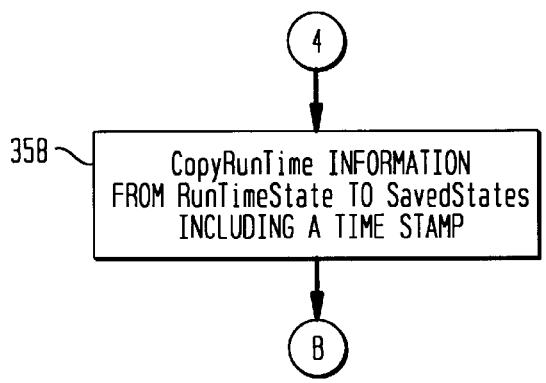

FIG. 4 shows the output 70 of the algorithm. The terms of the output data structures are set out below:

| OneLayoutArray: | | | | | | |
|---|---|---|---|---|---|---|
| Array Index | Image No | Xpos | Ypos | Height | Width | ScreenInfo |
| 1 | 1 | 0 | 0 | 512 | 512 | 1 |
| 2 | 2 | 0 | 0 | 512 | 512 | 2 |
| 3 | 2 | 0 | 0 | 512 | 512 | 1 |
| 4 | 3 | 0 | 0 | 512 | 512 | 2 |
| 5 | 3 | 0 | 0 | 512 | 512 | 1 |
| 6 | 4 | 0 | 0 | 512 | 512 | 2 |
| 7 | 1 | 0 | 0 | 256 | 256 | 1 |
| 8 | 2 | 256 | 0 | 256 | 256 | 1 |
| 9 | 3 | 0 | 256 | 256 | 256 | 1 |
| 10 | 4 | 256 | 256 | 256 | 256 | 1 |
| 11 | 5 | 0 | 0 | 512 | 512 | 2 |

| VirtualPageForLayout: | | |
|---|---|---|
| Array Index | Start | Stop |
| 1 | 1 | 2 |
| 2 | 3 | 4 |
| 3 | 4 | 5 |
| 4 | 7 | 11 |

(iii) Display Protocol Specification and Display Generation Algorithms

Two major algorithms accomplish the above tasks; The Display Protocol Specification and the Display Generation Algorithms. First, the intended user interacts with the Display Protocol Specification algorithm, by which the user indicates what the display(s) should look like during the session, per session type. This creates a prototype for image navigation for that session type. The Display Generation Algorithm uses the information in one such prototype to control image display during an actual session.

Another concept involved is that of public/private/group annotations, and, concomitantly, "colored pencils." While viewing a set of images, a user—for example, a doctor—may typically make a variety of annotations, such as marking regions of interest (ROI), taking measurements by drawing a line, leaving voice and/or text "post-it"' messages. It is helpful to other users to distinguish marks made by user A from those of user B, and even a user to distinguish his or her own earlier remarks from current ones, for example. Colored pencils are described in related Application Ser. No. 08/451,830.

An image viewing session may also depend on viewing multiple versions of related image data. In publishing, for example, a viewer may wish to see a book under two different fonts. Different versions may also be based on dates (i.e., yesterday's work vs. the day before's). Further, it is also possible to allow a free-hand session type to be created.

The goal of the Display Protocol Specification algorithm is to describe all possible static information regarding an image viewing session. This includes the initial workspace configuration, the image sets to be associated with each workspace, presentation factors that may be known, increment units for going backwards (or forwards), within a workspace; and how to move from the initial configuration to a subsequent one. This information constitutes the tree of workspace setups referred to above. The session configuration file stores this tree. For modularity sake, this file points to a workspace schematic table, which provides a description the physical layout of workspaces on a machine. An exemplary layout is described in Appendix B.

Each time the Display Protocol Specification algorithm is used to create a new session, the User-To-Session Database should also be updated. This database is a set of 4 tuples: System type, User name, Session type, Session Configuration file. The system type field reflects the variety of workstations that the user may be working on. Thus, for example, a specific user might have two entries for a single session type, reflecting the two different workstations he/she typically uses. Session type includes a name for the session type. For an example, set out below is a fragment of a User-To-Session Database from a preferred embodiment:

```
# Any line beginning with a # is a comment. Empty lines are
  ignored.
# This is an example User-To-Session Database
# System Type User Name Exam Type Session Configuration File
2ScreenSetup shilcrat CTSpineshiclcrat. CTspine.protocol
    # This is a setup for one CT series with one scout image
    2Big+1ScreenSetup mishra head mishra.head.protocol
    # This is a complex MR study (Rule Out Aneurysm) with 5
      different Series (15936)
    2Big+1ScreenSetup mishra BRAIN/MRA mishra.brain-mra.protocol
    2Big+1ScreenSetup mishra IAC mishra.IAC.two.series.protocol
    # End of User-To-Session Database
```

In sum, the goal of the Display Protocol Specification algorithm described below is to fill (or add to) these four tables: a Workspace Schematic Table; an Image-to-Workspace Mapping Table; a Session Configuration File; and the User-To-Session Database. These are the outputs of the algorithm. Examples of the Workspace Schematic Table, Image-to-Workspace Mapping Table, and Session Configuration File are provided in Appendix B.

The algorithm also requires four input files (besides the user's interactions): (1) System Type Description File; (2) System Name to Type File, both of which can be created off-line by a systems administrator; and (3) Session Type Description Table, and (4) a user.profile.

The System Type Description File is a table of triples using symbolic names for workstation configurations, with the full details of the workstation:

| System Type Name | Number of Monitors (Monitor Number: Width × Height) + |
|---|---|

For example, one entry might be

| System Type Name | Number of Monitors | (Monitor Number: Width × Height) + |
|---|---|---|
| 2Landscape + 1Control | 3 | 1:1000 × 1000, 2:1600 × 1200, 3:1600 × 1200 |

The System Name to Type File is a set of pairs (System Type, System Name.) Thus, if Multi1 is the name given to a type of system having a workstation with two landscape monitors and a control monitor (2Landscape+1Control, Multi1) would be an entry in this table. This table must also be configured so as to aid in possible monitor failure. Thus (RightLandscape+1Control, Multi1) and (LeftLandscape+1Control, Multi1) would also both be entries, to account for possible failure of a monitor(s).

The Session Type Description Table lists different session types supported by the system. This table includes a set of triples: (Name of Session Type, Image Sets in this Session Type, Default Configuration Locator). The job of Default Configuration Locator is to provide a way to view this session type should a user not desire to create his own version. The locator points to files in a predetermined manner using the method of the present invention. A locator may point to many files, differing by system type.

For example, the session type Non-fiction Book I might have three corresponding image set types, table of contents, index, and chapters, and "default-non-fiction" as a Default Configuration File. Default-non-fiction might have three, simultaneously shown workspaces, one for each image set type.

One example would be:

| BRAIN/MRA R/O Aneurysm | T1 SAGITTALS, T2 AXIALS, SPIN DENSITY, 3D TOF C.O.W., RAW IMAGES (3D), COR LOC USE NECK COIL, 2D TOF MRA OF CAROTIDS, RAW IMAGES (2D) | MRA-R/O-Aneurysm. Default |
|---|---|---|

Another example is:

| Non-fiction Book I | T of C, Index, Chapters | NF-BookI.Default |
|---|---|---|

A user profile may be used, which may contain information as follows:

| User Name | Password (Optional) | Group Name List | Colored Pencil Info | Defaults List |
|---|---|---|---|---|

Group Name List is a list of groups with whom this user may participate. Under different security needs, the user may require a different password for each group of participation, and so the user would have several entries in the user.profile. Also, a group of people can invent a user name, and use that as the basis of an entry. The Defaults List can contain default information such as a default forward or backward number, a default time interval for automatic stack movement (cine), default font choices, etc.

The algorithm provides for indicating when data structures and tables get instantiated. System provided defaults are also indicated, where applicable. Note that while "outputing" files is described, the user can, at any time, discard the session without actually changing any file. The true outputing occurs only when the user wishes to save a session.

Display Protocol Specification algorithm:

FIG. 6 is a flow chart 200 of a preferred display protocol specification algorithm.
1. Open files: System Type Description File, System Name to Type File, Session Type Description Table, and user.profile (step 202).
2. Initialize variables: workspaceNum=0; workgroupNum=0; workspaceInConfigNum=0; configNum=0; parentconfig=none,retainedWorkspaces=empty (step 204).
3. User may enter target system type (step 206), or it may be derived based on the characteristics of the currently used system. Note that user may design for a target system which is not the one being worked on.
    The derived system type is found as follows: Consult operating system for system name. Find system type via system name to type file, using the largest type for this name.
    Another variation for the derivation: Run a screen check algorithm (to determine which screens are on and working) and then consult the System Type Description File, to determine the matching system type.
    Comment: Our first goal is to instantiate the system type. Output of system type in User-To-Session Database (step 208).
4. User is allowed to enter user individual or group name (step 210). This may involve the use of passwords, which can be verified against the user.profile.
    Comment: Establish author in order to record protocol by author and security.
5. User is offered a palette of types of image viewing sessions to choose from (i.e., Book with table of contents and index, book with table of contents, CT Spine, MR Brain, etc.) (step 212). This palette can be derived from the Session Type Description Table, which contains the listing of session types (step 214). The user is also offered an "old/new" toggle, to indicate how to proceed if multiple versions based on date are desired to be viewed.
    Note: Preferably, users may create individualized viewing sessions by making on-line modification of the Session Type Description Table.
    Comment: Output part of session type in User-To-Session Database.
6. If user does not have a "colored pencil set" for this (or all) session types, run the colored pencil algorithm (step 216).
    Comment: Output a "super" annotation matrix (in user.profile), which will be pruned at run time to actual available annotations.
7. If desired, present a palette of typical tools such as clock, calculator, etc. (step 218). This may be one of the options set in the user.profile, or it could be a default of the algorithm.
    Comment: Users will frequently wish access to typical tools.
8. Based on user's session type choice, a palette of the image sets comprising that session type (as reflected in the Session Type Description Table) is offered to user (step 220). Thus, for example, book with separate index and table of contents would have a chapter image set, table of contents image set, index image set, and possibly others. Two or more distinct image sets may be offered, for example, if the session type involved looking at two distinct book types, image sets corresponding to each would be presented.
    If old/new was also set, two buttons so labeled are also presented (step 222). Old/new compares images from a previous image set with images from the current image set.
9. While (A) another (new) configuration is desired (step 224):
    (a) Increment configNum (step 226);
    (b) Allow user to specify name for setup (a default is created if not) (step 228). User may also specify condition under which to use this setup (i.e., there may be several trees in a forest of setups). Should the user desire more than one root node, it is advisable to use conditions to choose among them at run-time. User may supply parent information, or it will be taken from parentconfig if not supplied. (A list of setups, and matching schematic can be displayed to aid the user in this.)
        Comment: Output Setup Name, parent=parentConfig, and Condition (if used) in Session Configuration file (step 230).
    (c) Present a schematic of the work areas available at the workstation, based on the determined system type, and the retainedWorkspaces variable (step 232).
    (d) While (B) another workspace is desired in this configuration (step 234):
        (i) The user may divide available work area into a workspace, or re-use one of the previously defined ones (via retainedWorkspaces) (step 236).
            Increment workspacenum, workspaceInConfigNum, initialize numSetsInWorkspace=0 (step 238).
            Comment: Output workspace number workspaceNum in the Workspace Schematic Table (for node ConfigNum) (step 240).
        (ii) User creates a workspace of S segments, or re-uses a previously defined workspace of S segments (step 242).
            Comment: For each of the S segments, output info for that segment number (in the area for workspace number workspaceNum) in the Workspace Schematic Table (for node ConfigNum): segment number (1–s), Screen number of segment display, Xpos, Ypos coordinates for upper left corner of segment, width, height of segment (step 244).

There are two modes for workspaces, Keep In-Sync Mode and Solo Mode. The former means will be "paged through" together; the latter, independently. User chooses between these two modes (step 246):

A. Keep In-Sync Mode:
   In this mode, user indicates which previously created workgroup this workspace belongs to, or creates a new one. A schematic showing previously created workgroups can be displayed, as an aid. In either case:
   Output in-sync as type for workspace number workspaceNum in the Workspace Schematic Table (for node ConfigNum), and chosen workgroup number (step 248). If creating a new one, increment workgroupNum first.

B. Solo Mode:
   Comment: Output it solo as type for workspace number workspaceNum in the Workspace Schematic Table (for node ConfigNum) (step 250).

iii. Now user characterizes the workspace (step 252):
   A palette of workspace mode is presented. These include frame, pre/post, 3-D, page, stack, and overview. The user then chooses a workspace type for the workspace. User is also allowed to set automatic, at user specified timing, image re-display (called cine, in stack) or re-display on user command.
   Comment: Output chosen mode as mode for workspace number workspaceNum in the Workspace Schematic Table (for node ConfigNum), including any relevant chosen timing info (step 254). Create a temporary variable with the format of the Image-to-Workspace Mapping Table, called IW, store workspaceNum as Workspace number. Set numSets in workspace=0 (step 256).

iv. While (C) another image set is desired in this workspace (step 258):
   A. Choose mode for image set: Side-by-side, catenated, separated (step 260).
   B. User chooses either a tool, from the tool palette (a), or a type of image set, from the image set palette (b) (step 262).
      Note that the user may choose an image set type or tool multiple times.
      I. User chooses a tool from tool palette. User may set some options for the tool (or some may have been pre-chosen in user.profile).
      II. User chooses an image set, and old or new, if applicable. (In old/new, user is forced to choose either old or new.) Update the temporary variable with new value of numSetsInWorkspace as the new number of images in this workspace. Output image set (or tool) type, mode for image set.
   C. Increment numSetsInWorkspace (step 264).
   D. Add mode, image set name (or tool type of IW) (step 266).
   E. The user is also allowed to set image presentation factors such as font, contrast, color, and magnification (zoom) factor, or these may be defaulted to via the user.profile. Update the temporary variable, adding these presentation factors (step 268).
   F. User may choose forward, backward count or these may be defaulted to via the user.profile (step 270). Update the temporary variable, adding forward, backward count of current choice at end.
   End of While (C)

v. Once the user has finished adding image/tool sets, the information for this workspace in the Image-to-Workspace Mapping Table is complete and we therefore write out the temporary variable to the Image-to-Workspace Mapping Table, adding it to the end (or new file, if this is the first workspace) (step 272). Output, for image set number numSetsInWorkspace, for workspace number, in the Image set type, or tool type, as applicable.
End of While (B).

Note that the user has now specified that this session type begins by displaying a specific set of images (old or new if applicable), possibly starting from a given image number on specific (parts of the) workstation screens, either in-sync with others, or solo. To offer user feedback, the system may display the choices made using sample session data (step 274). Should the user not like what is displayed, an "edit" menu may be brought up to change any of the above: workspace or type, post-pre/view, etc.
Comment: A workstation visual state is instantiated, which corresponds to a node of workspace setup tree. Output the next node in the session configuration file (step 276).
Before creating a new configuration, user is allowed to save some or all of the workspaces. The retained-Workspaces reflects this choice, or is empty (step 278).
Set parentconfig=setup name (to enable next parent setup to default to prior defined setup) (step 280).
End of While (A)
When user exits the above steps, we update the User-To-Session Database showing this Session Configuration file in a 4 tuple with this session type, user name, and system type (step 282).

Display Generation Algorithm

The Display Generation Algorithm ensures the display of particular image sets according to the general rules as established by a user via a Display Protocol Specification session (or by a default). It does so by interacting with run-time algorithms previously described such as the initialize routine.

A number of inputs are required by the Display Generation Algorithm: (1) the user.profile, which also helps provide security; (2) the User-To-Session Database; (3) the system name to type file; (4) the Session Configuration file; (5) the session specifying identifier (SSI); (6) the session type hierarchy table; (7) actual image data; (8) the Display Map (described below); and (9) the system type description file. The Display Generation Algorithm uses this information to communicate with the previously described run-time algorithms such as the layout algorithm, to display the images as indicated via a previous Display Protocol Specification session (or via a default). During user interactions, the run-time algorithms provide most of the support.

Each collection of image sets, such as those comprising the data for a book session, or a radiological diagnosis session, has a corresponding Display Map. The Display Map is a table keyed to the session specifying identifier (SSI). A session specifying identifier is an application specific way of distinguishing viewing sessions. For example, for medical imaging it might be patient information (i.e., name, SSN), for publishing it might be author and title information.

The Display Map contains all the information needed regarding the image sets, their annotations, and any review subsets which have been created (via prior running of the display generation algorithm.) The Display Map also contains information allowing the user to save and resume an image viewing session, such as: exactly which configuration (and its contents) when a save was requested, and the last state of all other configurations the user saw in the session (whether in one part, or via many save/resume commands) —that is, until a saved session is quit, it remains active, and may be repeatedly resumed (and saved):

SSI (i.e., patient name).

Other data related to SSI (i.e., patient address).

Type of session corresponding to this data (i.e., Book with index and table of contents). This is discussed in further detail below.

Names of the distinct image sets comprising the above type (i.e., Chapters, Index, Table of Contents).

A pointer to an annotation matrix which contains all annotations (made by any user in the system).

Saved Sessions Information: For each (active) saved session:

Author of saved session

Dates of saves (initial and all subsequent)

Pointer to set of saved run-time states (corresponding to configurations seen), in order of last visited.

Review information: For each review set created based on this set of image sets

Name and author of review set;

Type of review set (collage or not);

An array of timestamped images, along with presentation factors, chosen to be in this review set.

Comment: It is possible to organize the review information differently with the same resultant functionality.

Different relationships between the annotations to the full image set and its review subsets are possible—they may be kept separated, or not. This data structure allows for either.

The session type can be chosen to reflect the finest possible categorization of the session. For example, Book with index and table of contents is more detailed than Book with table of contents. It is important to know the finest correct type. However, it is possible that the user wants to ignore some types of information, and so would like to choose to see the information displayed in a coarser type. To continue the example, a user may wish to ignore the index of a book, or the table of contents, or both. For this reason, a Session-Type Hierarchy Table, which orders all the session types by decreasing generality, may be used. Consulting this table provides the information that, for example, a Book with index and table of contents can also be displayed as a Book with table of contents or a Book with index, and how to do so (i.e., which image set types to use). Also, a review session is a possible generalization of the type of session it was created under, and transitively, any generalization of the creation session type. For example, a review session created by using a Book with index and table of contents session type can be shown under the Book with index and table of contents protocol, and any protocol that a Book with index and table of contents can be shown under, such as Book with table of contents or a Book with index. When a user initiates a session using a specific SSI (i.e., Patient Name), the session type can be reflected by an automatic choice of display protocol. A compatible, more general session type can be derived from consulting the session type hierarchy table.

Note that the session type hierarchy table may be used by a display protocol editing system to help in designing more general protocols from previously defined ones. For example, Book with index and table of contents session type could be edited to produce Book with index, or Book with table of contents, by leaving out the "extra" workspaces. The opposite is also true, where a more specific protocol may be quickly created out of a more general one by allowing the user to quickly re-design already assigned workspaces, and focus only on placement of new image sets. Thus, for example, an editor could help a user create a Book with index and table of contents from Book with index. In general, this editor can duplicate a part of a previously defined protocol to create a new protocol (i.e., create workspaces as per first configuration of CT Spine; or copy the layout of commonly named image sets or tools), as all this information is in files that can be copied (or pointed to).

Note the existence of a system type conversion algorithm which is designed to aid in fault-tolerance. For example, it allows a user to specify a protocol for a system with one screen down, such as the leftmost, which it then automatically converts into a protocol for any other (same size) screen down. This is because system details (such as X details) require that one may give specific name to each such system, and each relevant screen be addressed by name or location, but the functionality of the two systems is generally identical to the user. A translation may be provided, thereby obviating the need for the user to essentially repeat the information module a different screen failure. This is accomplished by mapping the contents of a bad screen to a now good screen.

The Display Generation Algorithm is also responsible for outputting the information regarding review sets, as they are created, and also makes sure sessions are saved and restored for later continuation. The outputs of the Display Generation Algorithm thus include modified versions of the annotation matrixes, and review sets, as well as saved states, if desired.

The Display Generation Algorithm

FIG. 7 is a flowchart 300 of a preferred Display Generation Algorithm according to the present invention.

1. Open user.profile (step 302), if desired, verify password (step 304). If fail, end (step 306).

2. Create temporary variable for saved states, savedStates, and a temporary variable for saving annotations, savedAnno (step 308).

3. Run a screen check algorithm (to determine which screens are on and working) and consult the System Type Description File, to determine system type (step 310).

Comment: Our first goal is to create the system type.

4. Open Files: User-To-Session Database, the Session Configuration file, the session type hierarchy table (step 312).

5. Offer user palette of "available" image sessions. There are many ways to develop this palette, depending on the application. It can be the SSI's of all image collections; filtered by date, filtered by owner, and so on. User chooses an image collection to work on, by choosing SSI (step 314).

Note: it is possible to start the session in many ways. For example, available session types may be shown, and let user move into SSI from this direction. These variations are simple differences to this algorithm.

6. Using SSI, find the Displaymap for this image collection, determine finest session type, "fst" (step 316). If user has an active saved session, offer to resume (step 318). If yes, use display map to locate last saved run-time state, copy this into RunTimeState, and pass to initializer. Copy saved state information from display map into the temporary variable savedStates (step 319). Continue at step 13.

If no, we have to create the information for the first run-time state:

7. Report fst to user; ask if over-ride is desired. If yes, present choices determined by consulting the session type hierarchy table, and all previously created review types, as found in the Display Map (and which this user has rights to, if such protection is applicable) (step 320).

Comment: After this step we have the desired session type, "dst".

8. Consult User-To-Session Database with system name to determine if the user has chosen a session type for which he/she has not specified a session configuration file (step 322). Note that this includes the possibility of the user's having a protocol for a workstation type assuming all screens are working, and dynamically it is discovered that one or more are not.

If so, print a message and display according to system defaults, as found in the Session Type Description Table. Otherwise:

9. If session type is for "old/new", and there is an older image set for this SSI of the same type, send message to user to confirm that "old/new" is wanted (step 324). If not, use the solo session type; if none specified for this user, use system default.

10. Consult display map to find relevant image, review and annotation files for specified session. Consult user-.profile to find the annotation choice list (step 326). Find all public or group annotations which are a subset of annotation choice list, and create run-time annotation matrix.

11. Find root node in the Session Configuration file. (If more than one, check conditions to determine which to use. If no conditions, or multiple apply, take first one encountered.) Set ActiveNode=Node Number (step 328).

12. The following information is passed to the initializer routine:

Consult workspace schematic table for node ActiveNode, to obtain workspace configuration info. Consult image to workspace mapping (as listed in Session Configuration file) to determine which image set types are needed for this configuration. Consult display map to locate corresponding image sets. Open each such image set, review set, and annotation set, and create file handles for them. If tools are used (rather than image sets), pass tool name (step 330).

13. User now interacts with images as provided by the image tool-kit's run-time algorithms (step 332). The display generation algorithm is invoked again whenever one of these events occurs:

a) Exit viewing session: This means exit without saving run-time state information, or deleting saved information from the display map if any existed (step 334).

Output modified versions of annotation matrices reflecting changes made to annotations if user desires to keep such changes (and has permission to do so) (step 336). Consult savedAnno to accomplish this.

Output modified versions of display map, deleting information regarding this session if it was previously saved.

b) Save viewing session (step 338): If the first save (step 340), an entry for this session must be made in display map, with author, date, and info from the temporary variable savedStates (step 342). If a subsequent save, update date, and saved state info, via the temporary variable savedStates (step 344).

c) Go to next/previous configuration (step 346):
        i) Add annotation information per image set to savedAnno. Find next, or previous configuration name/number in session configuration file Set ActiveNode=Found Node Number (step 348).
        ii) If this is a resume (step 350):
            Current configuration node is already in savedState; replace it with most current run-time state information from RunTimeState, re-timestamp (step 352).
            If next (previous) configuration is in savedState (step 354), it has been seen, and could be resumed by calling initialize with the relevant info.(step 356). If not, go to step 12. (Note: it is possible to allow user to carry over presentation factor changes by modifying the saved state accordingly).
        iii) If this is not a resume:
            Link run-time state information from RunTimeState to savedStates, adding a timestamp (step 358). Create next run time state for ActiveNode by following step 12 above.

d) Go to configuration number/name: This is a simple generalization of the above based on the user being able to choose an arbitrary configuration via its name or number. The only difference is we do not need to find ActiveNode via the session configuration file.

The above described methods according to the invention are intended to be illustrative only. Numerous alternative methods may be devised by those skilled in the art without departing from the spirit and scope of the claims.

APPENDIX A

Tools which may be used by the present invention include:

Floaters: An image can be duplicated and "floated". A floater may be moved to any location on any screen. This allows the user to override typical image ordering.

Freezers: Any image(s) may be frozen in place, so that when moving the frame (in frame mode) that specific image stays where it was, and the images around it are replaced (in sequence). This is another way of examining a particularly important image, not afforded by film.

GoTo Slice: In medical imaging, where a scout image marked with "slices" is presented and the user may choose, by clicking on the slice, the image that corresponds to the selected slice. These slice marking correspond to the intervals at which the images were acquired.

Annotation: Ability to mark images with drawing components such as line, circle, etc., voice, graphics or text, or an entire MM-Memo (described in the related application, Ser. No. 08/451,830).

Image modifying operations: rotation, color change, font change, measurement within image, intensity change, and the like.

Image navigation techniques allow users to focus quickly on the limited number of images that are (currently) of greatest interest. These are described in detail below. Briefly, these techniques include:

Pre/post View Techniques: allow the user to display previous, previously seen, to be seen, selected only, annotated only, etc., images in miniature.

Overview Mode: an entire image set can be viewed in miniature. This can also be done in tandem with a larger display of the same images, with the corresponding images in the overview set highlighted (thus acting like a "roadmap"). Some images may be de-selected and removed from the list of displayed images from all workspaces.

Annotated Only: automatically displays only those images which have been annotated. The user may choose both the annotation author(s) (or all), and annotation media type (e.g., text, graphical, voice, all, etc.) This feature also comes with a "neighborhood" option, wherein each annotated image will be shown with a user selectionable number of images arranged around the annotated image.

Customization allows users the freedom to design a display system which best meets their needs, and the available workstation.

Session management tools allow users to store and re-store on-going sessions. A user exiting CINAD can return to the setup the session was displaying before exiting. A variety of image review techniques allow users to create and/or display images found to be of specific importance in a previous session. These techniques require tools to create the review material, and to subsequently display it. "Review sets" can be created by a user as a subset of an image set, and given a name (i.e., most-colorful-pictures, most-interesting pictures, ShowToBoss). Review sets are created using the following techniques:

Place Markers: Mark start and/or stop images in an image set; each marker (both) can be given a name (e.g. start-show-boss, start-show-client). In a subsequent session, if this review feature is activated, with this place marker name, the images in this image set will start (stop) with the start marker image. It is possible to create a set of such markers, whereby, for example, those images between a stop marker and the next start marker may be skipped.

Choose Individuals: Individual images can be chosen as a review set.

Review Set Displays:
  Collage: images can be displayed in the order of choice, or in numeric order (each image has a number); or image set choice e.g., all of the images from the first chosen image set, followed by all of the images from the second chosen image sets, or other user definable orders.
  Display Protocol Basis: images are displayed according to display protocol, except that only a subset of the original images are displayed.
  User Definable Review Display Protocol: the user can create a review display protocol using CINAD. A display protocol may be quickly modified to yield a display tailored for review. Searching modification may be appropriate, for example, in a brain MRA case, raw data may be included in the general display protocol, but may be excluded from the review display protocol.
  Edit In Review: during a session the user can add/remove annotations (given proper access, if applicable); these annotations will be made appropriately visible in subsequent sessions either to the review set, or to the full set, as desired (again, with proper access, if applicable).

APPENDIX B

An exemplary imaging system layout may include:
The number of workspaces, say N
For each of the N workspaces:
   The number of the workspace (1–N)
   Type of workspace: In-Sync (lockstep) or Not. If In-sync, all workspaces in the to be kept in lockstep form a numbered work group; and each workspace in the workgroup receives the same workgroup number which is here recorded.
   The number of segments (distinct rectangles) in the workspace, call it S
   The mode of the workspace (stack, frame, 3D, page) and related details (e.g. timing interval if stack is to be in automatic re-display)
   For each of the S segments
      Segment number (1–S)
      Screen number of segment display Xpos, Ypos coordinates for upper left corner of segment width, height of segment An Image-To-Workspace Mapping Table shows which type of image set gets mapped to which workspace in the workspace schematic table. The Image-To-Workspace Mapping may be broken out having:
   Workspace number
   Number of images sets or tools to be displayed in this workspace
   For each of the above images sets (or tools)
      Format type: The format type may be, for example: catenated, which means show all images sets as one combined one, so that a frame workspace would box them continuously, or separated, which forces breaks between images sets, placing the first image of the subsequent image set on a new page. Another example is side-by-side, where, for example, two (or more) tools are placed side-by-side in a workspace.
      Image set type (i.e., table of contents, book chapters, spine with contrast, T1, T2, etc., or tool type)
      Forward, backward image movement units (usually not used for a tool)
      Presentation properties to be used with this image set type; this includes information such as:
      Color
      Intensity
      Zoom
      Rotation
      Video toggle
      Clipping One pair of the above two files is preferred for each display configuration, hence this could be implemented via an array of such file pairs. The SessionConfiguration file, which defines the tree of workspace setups, may be described by using:
   Setup Name: e.g., Spine.Setup.0
   Parent Setup: (will be none if this is the root)
   Condition: (condition on which to use this setup, may be none if it is to always be used).
   Node Number: The number of this tree node, in creation order.
   Workspace schematic table: States workspace configurations, and their types. Image to workspace mapping table: States which image set(s) should be mapped into which workspace (in a specific schema.)

A fragment of a sample Session Configuration File from a preferred embodiment is set out:

```
# Any line beginning with a # is a comment. Empty lines are
  ignored.
# This file is mishra.brain-mra.protocol
# We have two setups in this file

Setup Name: overview
Parent Setup: none
Condition: true
Workspace Schematic Table:
    # This entry indicates the number of workspaces
    1
    # The succeeding entries form the specification for the workspaces
    # The next entry indicates the number of segments and is
formatted as:
    # Workspace number    Number of Segments    Mode      Sync ID
        1                         3             overview    -1
    # Below are the specifications for each segment formatted as:
    # Segment No.   Screen No.  X Position  Y Position  Width  Height
         1             3            0          50       1575   1080
         2             2            0          50       1575   1100
         3             1            0          50       1100    900
Image-To-Workspace Table:
    # WorkSpace number    # Number of series
        1                       7
    # Series Type   Series Name    FB Count   Level/Window   Zoom  Video
      Rotation      Flip  Clip
      Catenated     T1 SAGITTALS      12      Default        1.0   Normal
      AntiClock0    NoFlip  NOCLIP
      Catenated     3D TOF C.O.W      12      271/541        0.5   Inverse
      AntiClock0    NoFlip  Noclip
      Catenated     RAW DATA (3D)     12      Default        0.5   Normal
      AntiClock0    NoFlip  Noclip
      Catenated     T2 AXIALS         12      Default        1.0   Normal
      AntiClock0    NoFlip  NOCLIP
      Catenated     SPIN DENSITY      12      Default        1.0   Normal
      AntiClock0    NoFlip  NOCLIP
      Catenated     2D TOF CAROTIDS   12      Default        1.0   Inverse
      AntiClock0    NoFlip  Noclip
      Catenated     RAW DATA (2D)     12      Default        1.0   Normal
      AntiClock0    NoFlip  Noclip
Setup Name: Standard Brain/MRA
Parent Setup: overview
Condition: true
Workspace Schematic Table:
    # This entry indicates the number of workspaces
    3
    # The succeeding entries form the specification for the workspaces
    # The next entry indicates the number of segments and is formatted as;
    # Workspace number    Number of Segments:   Mode     Sync ID
        1                        1              Frame     -1
#Below are the specifications for each segment formatted as:
    # Segment No.   Screen No.  X Position  Y Position  Width  Height
         1             3            0          50       1575   1080
    # Now continue as above for the other workspaces:
    # Workspace number    Number of Segments    Mode     Sync ID
        2                        1              Frame     -1
    # Segment No.   Screen No.  X Position  Y Position  Width  Height
         1             2            0          50       1575   1100
    # Workspace number    Number of Segments    Mode     Sync ID
        3                        1              Frame     -1
    # Segment No.   Screen No.  X Position  Y Position  Width  Height
         1             1            0         600       1100    300
Image-To-Workspace Table:
    # WorkSpace number    # Number of series
        1                       3
    # Series Type   Series Name  FB Count  Level/Window  Zoom  Video
      Rotation      Flip  Clip
      Catenated     T1 SAGITTALS      6     Default       1.0   Normal
      AntiClock0    NoFlip  NOCLIP
      Catenated 3D  TOF C.O.W.        6     271/541       0.5   Inverse
      AntiClock0    NoFlip  Noclip
      Catenated     RAW DATA (3D)     6     Default       0.5   Normal
      AntiClock0    NoFlip  Noclip
    # WorkSpace number    # Number of series
        2                       4
    # Series Type   Series No.  FB Count  Level/Window  Zoom  Video
      Rotation      Flip  Clip
      Catenated     T2 AXIALS         12    Default       1.0   Normal
      AntiClock0    NoFlip  NOCLIP
      Catenated     SPIN DENSITY      12    Default       1.0   Normal
      AntiClock0    NoFlip  NOCLIP
    # Series Type   Series No.  FB Count  Level/Window  Zoom  Video
      Catenated     2D TOF CAROTIDS   12    Default       1.0   Inverse
      AntiClock0    NoFlip  Noclip
      Catenated     RAW DATA (2D)     12    Default       1.0   Normal
      AntiClock0    NoFlip  Noclip
    # WorkSpace number    # Number of series
        3                       1
    # SeriesType   Series Name  FB Count  Level/Window  Zoom  Video
      Rotation     Flip  Clip
      Catenated    COR LOC            6    Default       0.5   Normal
      AntiClock0   NoFlip  NOCLIP
```

We claim:

1. A display protocol specification method, comprising the steps of:

a. selecting a predefined user;

b. selecting a session type predefined for the selected user;

c. selecting an image layout predefined for the selected predefined user and session type;

d. selecting image sets to be placed in the selected image layout;

e. selecting a work area from available work areas for the selected image set;

f. selecting one of an in-sync mode and a solo mode for the selected work area;

g. selecting a workspace type for the selected work area;

h. selecting an image set mode for the selected work area; and i. saving each selection in a file.

2. The method of claim 1, wherein the step of selecting a session type comprises selecting from a plurality of session types predefined for the selected user.

3. The method of claim 1, wherein the step of selecting an image layout comprises selecting from a plurality of image layouts predefined for the selected user and session type.

4. The method of claim 1, further comprising the step of selecting a predefined computer set-up, and the step of selecting a predefined image layout is further based on the selected computer set-up.

5. The method of claim 1, wherein the step of opening a file further comprises deriving a layout according to a computer set-up being used.

6. The method of claim 2, wherein the step of deriving comprises:

a. determining how many monitors are being used; and b. comparing the determination with a predefined list of computer set-ups.

* * * * *